US012459087B2

(12) United States Patent
Santamarina et al.

(10) Patent No.: US 12,459,087 B2
(45) Date of Patent: Nov. 4, 2025

(54) SOCKET DRIVER TOOL

(71) Applicant: BLACK & DECKER INC., New Britain, CT (US)

(72) Inventors: Aland Santamarina, Woodbine, MD (US); Darren B. Moss, York, PA (US); Michael Huang, Suzhou (CN)

(73) Assignee: BLACK & DECKER INC.

( * ) Notice: Subject to any disclaimer, the term of this patent is extended or adjusted under 35 U.S.C. 154(b) by 347 days.

(21) Appl. No.: 17/979,321

(22) Filed: Nov. 2, 2022

(65) Prior Publication Data

US 2023/0140562 A1 May 4, 2023

Related U.S. Application Data

(60) Provisional application No. 63/274,756, filed on Nov. 2, 2021.

(51) Int. Cl.

*B25B 23/00* (2006.01)
*B25B 13/06* (2006.01)
*B25B 23/12* (2006.01)

(52) U.S. Cl.

CPC .......... *B25B 23/0035* (2013.01); *B25B 13/06* (2013.01); *B25B 23/12* (2013.01)

(58) Field of Classification Search

CPC ... B25B 13/06; B25B 13/065; B25B 23/0028; B25B 23/0035; B25B 13/56

See application file for complete search history.

(56) References Cited

U.S. PATENT DOCUMENTS 1,371,350 A * 3/1921 Campbell .............. B25G 1/085 81/177.4
4,926,721 A 5/1990 Hsiao
5,752,418 A 5/1998 Robins
6,354,176 B1 3/2002 Nordlin (Continued)

FOREIGN PATENT DOCUMENTS

CN 2276862 Y 3/1998
DE 202017102670 U1 8/2018

(Continued)

OTHER PUBLICATIONS

International Search Report and Written Opinion for International Patent Application No. PCT/US2022/048679, dated Mar. 22, 2023, pp. 1-68.

*Primary Examiner* — David B. Thomas
(74) *Attorney, Agent, or Firm* — Dickinson Wright PLLC

(57) ABSTRACT

A tool includes an elongated shaft and a socket positioning assembly disposed on the shaft. A rear end portion of the shaft is configured to be mounted for rotation by a hand tool or a power tool. The shaft is configured to support a first socket and a second socket. Each socket is selectively positionable on the shaft in either a use configuration or in a storage configuration. The socket positioning assembly includes a socket support member configured to support the first socket in its use configuration proximate the front end portion of the shaft, and a socket retainer configured to retain at least the second socket in its storage configuration on the shaft. The storage configuration is between the socket retainer and the rear end portion of the shaft. The socket retainer is positioned between the first socket and the second socket.

20 Claims, 21 Drawing Sheets

(56) References Cited

U.S. PATENT DOCUMENTS

| | | | |
|---|---|---|---|
| 6,418,821 | B1 | 7/2002 | Yamakawa |
| D510,847 | S | 10/2005 | McKnight |
| 7,340,984 | B2 | 3/2008 | Hsieh |
| 7,434,494 | B1 | 10/2008 | Snider |
| 7,983,250 | B2 | 7/2011 | Enders et al. |
| 7,997,169 | B1 | 8/2011 | Hack |
| 8,196,495 | B2 * | 6/2012 | Chen ........................ B25B 23/12 81/125 |
| D717,143 | S | 11/2014 | Jannitto |
| 9,533,407 | B1 | 1/2017 | Ragner |
| 9,833,887 | B1 * | 12/2017 | Liu ......................... B25B 21/00 |
| 9,981,366 | B2 | 5/2018 | Todd et al. |
| 10,093,005 | B2 * | 10/2018 | Zhang ................... B25B 15/001 |
| 10,259,107 | B2 * | 4/2019 | Wang .................. B25B 23/0035 |
| 10,328,554 | B2 | 6/2019 | Todd et al. |
| D861,453 | S | 10/2019 | Lai et al. |
| 10,442,062 | B1 | 10/2019 | Hack |
| 10,994,391 | B2 | 5/2021 | Flory |
| 11,065,744 | B2 * | 7/2021 | Zimmermann ..... B23B 31/1071 |
| 11,318,591 | B2 * | 5/2022 | Minor ................. B25B 23/0035 |
| 11,370,103 | B2 * | 6/2022 | Pham ...................... B25F 5/029 |
| 11,597,072 | B2 * | 3/2023 | Ting Ya ................ B25B 15/004 |
| 2008/0083304 | A1 | 4/2008 | Finn |
| 2018/0104808 | A1 | 4/2018 | Goeglein |
| 2019/0009392 | A1 | 1/2019 | Violette |
| 2021/0205967 | A1 * | 7/2021 | Chiang ............... B25B 23/0035 |
| 2023/0029732 | A1 * | 2/2023 | Springer ............. B25B 23/0028 |
| 2024/0058925 | A1 * | 2/2024 | Sada ....................... B25B 13/56 |

FOREIGN PATENT DOCUMENTS

| | | | |
|---|---|---|---|
| ES | 100118 | U | 7/1963 |
| JP | 3202192 | B2 | 6/2001 |

* cited by examiner

SOCKET DRIVER TOOL

CROSS-REFERENCE TO RELATED APPLICATIONS

This application claims the benefit of priority from U.S. Provisional Application No. 63/274,756, filed Nov. 2, 2021, titled "SOCKET DRIVER TOOL," which is incorporated herein by reference in its entirety.

FIELD

The present patent application relates to fastening tools.

BACKGROUND

Fasteners (e.g., hex head fasteners including hex head screws, for example, self-tapping) are commonly used in sheet metal, and metal and plastic part assemblies to secure work pieces together. Often many such fasteners are used at one time. Fasteners (e.g., hex head bolts) are also commonly used with threaded holes, nuts and/or self-locking nuts in assembly work. Also, wood and masonry screws can have hex head configurations.

Various tools exist in the prior art for driving these fasteners.

Also, because it is common to drive fasteners of different sizes in one project, speeding up the ability to install and remove various different sized fasteners such as hex head fasteners is desirable. Therefore, there is a need for hex sockets of multiple sizes that are interchangeable for use on a drive shaft, and a desire to conveniently and easily store these hex sockets while they are on the tool (e.g., hand or power tool (drill)) and also to store the hex sockets on the drive shaft when they are removed from the tool.

Some current double ended detachable socket adapters may be limited by maximum size. The limit is based on the maximum torque the elongated drive shaft can withstand before breaking. Increasing the outer diameter of the socket driver tool system can solve the maximum torque limitation, but the users demand small outer diameter for access reasons. Users may also be likely to lose loose sockets in such double ended detachable socket adapter.

Various improvements to the socket drivers or tools are desired.

SUMMARY

The present patent application provides improvements in the socket drivers or tools.

One aspect of the present patent application provides a tool. The tool includes an elongated shaft and socket positioning assembly disposed on the shaft. The elongated shaft has a front end portion and an opposing rear end portion configured to be mounted for rotation by a hand tool or a power tool. The shaft is configured to support at least two sockets, including a first socket and a second socket. Each of the at least two sockets is selectively positionable on the shaft in either a use configuration or in a storage configuration. The socket positioning assembly includes a socket support member and a socket retainer. The socket support member is configured to support the first socket in its use configuration proximate the front end portion of the shaft. The socket retainer is configured to retain at least the second socket in its storage configuration on the shaft. The storage configuration is between the socket retainer and the rear end portion of the shaft. The socket retainer is positioned between the first socket and the second socket.

In one embodiment, the second socket is configured to be switched from its storage configuration on the shaft to its use configuration in which the socket support member supports the second socket proximate the front end portion of the shaft. In one embodiment, the first socket is configured to be switched from its use configuration to its storage configuration on the shaft in which the socket retainer retains at least the first socket between the socket retainer and the rear end portion of the shaft.

In one embodiment, the socket retainer includes a magnet configured to apply magnetic force to retain the second socket, in its storage configuration, on the shaft and between the socket retainer and the rear end portion of the shaft. The magnet comprises a ring-shaped magnet. When the second socket is in its parking position and is retained by the magnet, the second socket is not required to maintain maximum torque rating In one embodiment, the socket retainer and the socket support member are disposed at axially separated positions along a longitudinal axis of the shaft. In another embodiment, the socket retainer and the socket support member are disposed at axially adjacent positions along a longitudinal axis of the shaft.

In one embodiment, each socket includes two different sized fastener driving openings including a first fastener driving opening disposed at a first end portion of the socket and a second fastener driving opening disposed at a second end portion of the socket. Each socket is configured to be reversibly retainable on the front end portion of the shaft with the socket support member supporting the socket such that, in a first use configuration of the socket, the first fastener driving opening extends axially forward of the front end portion of the shaft in order to receive and drive a first fastener when the shaft is rotated, and in a second use configuration of the socket, the second fastener driving opening extends axially forward of the front end portion of the shaft in order to receive and drive a second fastener when the shaft is rotated.

In one embodiment, the socket support member comprises a ball coupled to the front end portion of the shaft and configured to be biased radially outward to engage a groove inside one of the first socket and the second socket.

In one embodiment, at least the rear end portion and the front end portion of the shaft have hex shaped configurations. In one embodiment, the shaft has an annular groove in the rear end portion. The annular groove is configured for mounting the shaft for rotation by the hand tool or the power tool.

In one embodiment, the tool further comprises a magnet coupled to the front end portion of the shaft for magnetizing a fastener to be driven by one of the first socket and the second socket.

In one embodiment, the socket support member includes an inner flange and an outer flange, the inner flange and the outer flange have different dimensions for abutting different sized end portions of one of the first socket and the second socket.

In one embodiment, the socket is a stored socket that is stored on the shaft and between the socket retainer and the rear end portion of the shaft. In one embodiment, the socket retainer has a ball biased radially outward to engage with the stored socket. In another embodiment, the socket retainer has a groove and an O-ring that frictionally engages with the stored socket.

In one embodiment, the socket retainer is integrally formed with the shaft. In another embodiment, the socket retainer is configured to be movable relative to the shaft.

Another aspect of the present patent application provides a tool assembly. The tool assembly comprises an elongated shaft, a socket positioning assembly disposed on the shaft, a first socket, and a second socket. The elongated shaft has a front end portion and an opposing rear end portion. The rear end portion is configured to be mounted for rotation by a hand tool or a power tool. The socket positioning assembly includes a socket support member proximate the front end portion of the shaft, and a socket retainer between the socket support member and the rear end portion of the shaft. The first socket has a first end portion including a first fastener driving opening, a second end portion, and a first engagement portion disposed on an inner surface of first socket between the first and second end portions of the first socket. The second socket has a third end portion including a third fastener driving opening, a fourth end portion, and a second engagement portion disposed on an inner surface of the second socket between the third and fourth end portions of the second socket. The first socket and the second socket are interchangeably coupleable to the shaft in a use configuration or a storage configuration. In the use configuration, one of the first socket and the second socket is releasably retained on the front end portion of the shaft with the socket support member engaging the first engagement portion or the second engagement portion and the first fastener driving opening or the second fastener driving opening extending axially forward of the front end portion of the shaft in order to receive and drive a fastener when the shaft is rotated. In the storage configuration, the other of the first socket and the second socket is releasably retained on shaft between the socket retainer and the rear end portion of the shaft by engagement between the socket retainer and the other of the first socket and the second socket.

In one embodiment, the first socket includes a second fastener driving opening at the second end portion of the first socket, the first socket being reversibly retainable on the front end portion of the shaft with the socket support member engaging the first engagement portion, such that in a first use configuration the first fastener driving opening extends axially forward of the front end portion of the shaft in order to receive and drive a first fastener when the shaft is rotated and in a second use configuration, the second fastener driving opening extends axially forward of the front end portion of the shaft in order to receive and drive a second fastener when the shaft is rotated.

In one embodiment, the first fastener driving opening and the second fastener driving opening have different sizes.

In one embodiment, the second socket includes a fourth fastener driving opening at the fourth end portion of the second socket, the second socket being reversibly retainable on the front end portion of the shaft with the socket support member engaging the second engagement portion, such that in a third use configuration the third fastener driving opening extends axially forward of the front end portion of the shaft in order to receive and drive a third fastener when the shaft is rotated and in a fourth use configuration, the fourth fastener driving opening extends axially forward of the front end portion of the shaft in order to receive and drive a fourth fastener when the shaft is rotated.

In one embodiment, at least two of the first fastener driving opening, the second fastener driving opening, the third fastener driving opening, and the fourth fastener driving opening have different sizes.

In one embodiment, the first socket includes a shaft opening therethrough, the shaft opening connecting the first fastener driving opening and the second fastener driving opening. The shaft opening is configured to receive a portion of the shaft therein when the first socket is either in its first use configuration or in its second use configuration. The shaft includes a fastener retainer positioned at the front end portion thereof. The fastener retainer includes a magnet that is configured to apply magnetic force to retain the second fastener received in the second fastener driving opening when the first socket is in its second use configuration, and to retain the first fastener received in the first fastener driving opening when the second socket is in the first use configuration.

In one embodiment, the socket support member includes an inner flange and an outer flange, the inner flange and the outer flange have different dimensions for abutting different sized end portions of one of the first socket and the second socket. The first fastener is larger in size than the second fastener. When the first socket is in its second use configuration with the outer flange supporting the first end portion of the first socket, the fastener retainer of the shaft is configured and positioned in the second fastener driving opening so as to better accommodate the smaller sized second fastener in the second fastener driving opening.

In one embodiment, when the first socket is in its first use configuration with the inner flange supporting the second end portion of the first socket, the fastener retainer of the shaft is configured and positioned in the first fastener driving opening so as to better accommodate the larger sized first fastener in the first fastener driving opening.

In one embodiment, the first fastener driving opening is larger in size than the second fastener driving opening. The outer flange is larger in size than the inner flange.

In one embodiment, the outer flange and the inner flange of the socket support member are disposed axially adjacent to each other along a longitudinal axis of the shaft.

In one embodiment, the socket support member comprises a ball coupled to the front end portion of the shaft and configured to be biased radially outward to engage a groove inside one of the first socket and the second socket.

In one embodiment, at least the rear end portion and the front end portion of the shaft have hex shaped configurations.

In one embodiment, the shaft has an annular groove in the rear end portion. The annular groove is configured for mounting the shaft for rotation by the hand tool or the power tool.

In one embodiment, the tool further comprises a magnet coupled to the front end portion of the shaft for magnetizing a fastener to be driven by one of the first socket and the second socket.

In one embodiment, one of the first socket and the second socket is a stored socket that is stored on the shaft and between the socket retainer and the rear end portion of the shaft. In one embodiment, the socket retainer has a ball biased radially outward to engage with the stored socket. In another embodiment, the socket retainer has a groove and an O-ring that frictionally engages with the stored socket.

In one embodiment, the socket retainer is integrally formed with the shaft. In another embodiment, the socket retainer is configured to be movable relative to the shaft.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION

Figure 1A:
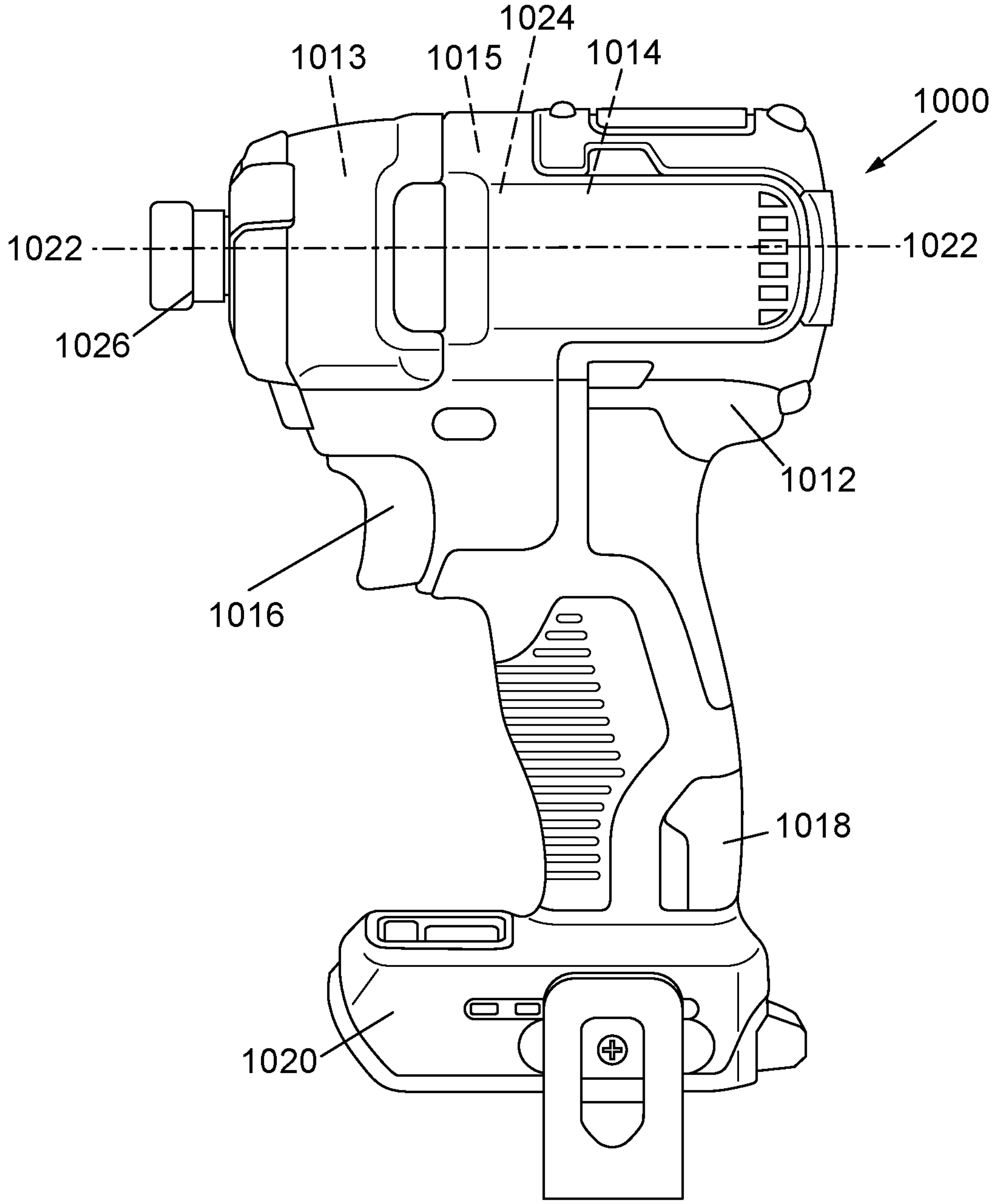
FIG. 1A shows an exemplary power tool configured to receive a socket driver tool according to an embodiment of the present patent application.
Figure 1B:
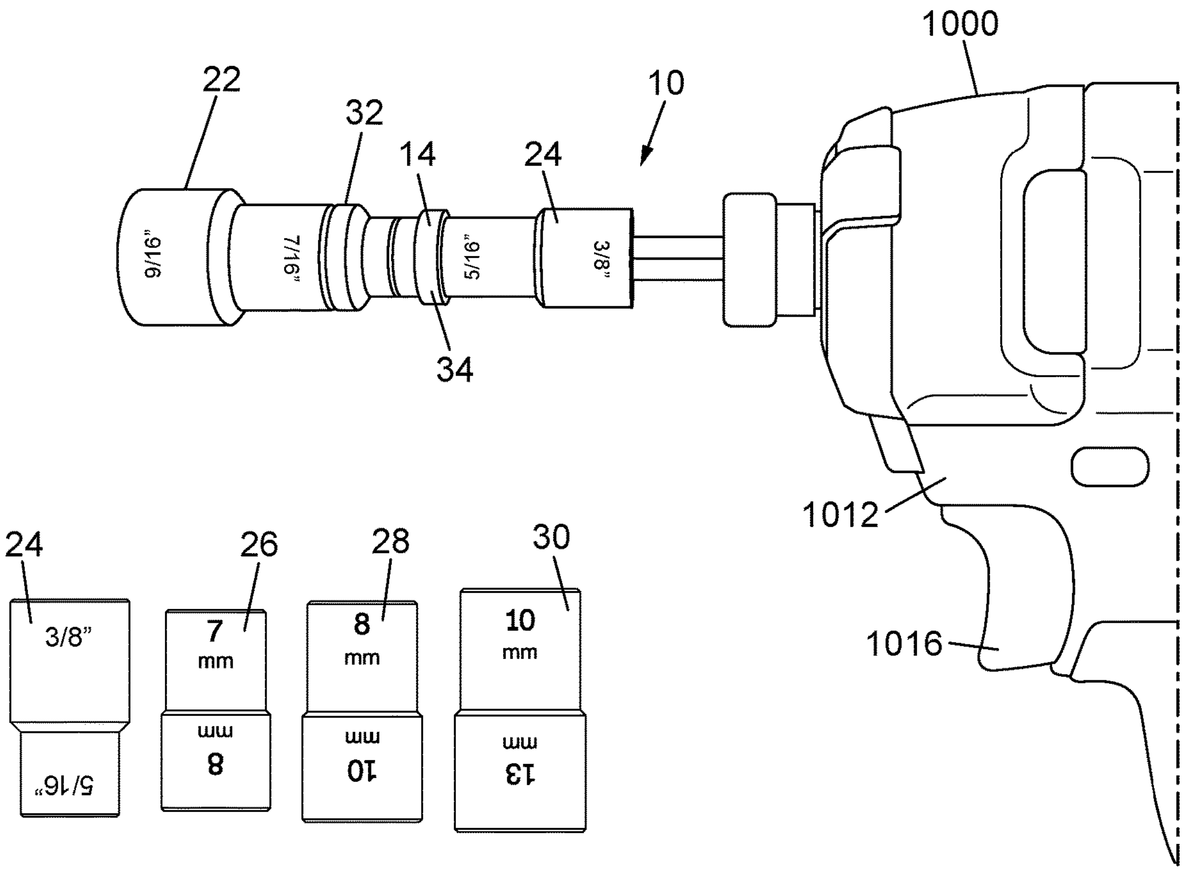
FIG. 1B shows a partial view of the power tool with the socket driver tool, according to an embodiment of the present patent application, being mounted therein, FIG. 1B also shows a plurality of detachable double-sided/double-ended sockets that are configured to be used with the socket driver tool.

In one embodiment, referring to FIGS. 1A, 1B, and 2-6, the present patent application provides a tool, e.g., in the form of a socket driver accessory 10. The tool 10 comprises an elongated shaft 12 and a socket positioning assembly 14. The elongated shaft 12 has a front end portion 16 and an opposing rear end portion 18. The rear end portion 18 is configured to be mounted for rotation by a hand tool (not shown) or a power tool 1000. In one embodiment, the rear end portion 18 has a circumferential groove 20 for mounting the shaft 12 for rotation by the hand tool or the power tool 1000. The shaft 12 is configured to support at least two sockets 22, 24, 26, 28, and 30 (as shown in FIG. 1B), including a first socket 22 and a second socket 24. Each of the at least two sockets 22-24 are selectively positionable on the shaft 12 in either a use configuration or in a storage configuration. The socket positioning assembly 14 is disposed on the shaft 12. The socket positioning assembly 14 includes a socket support member 32 that is configured to support the first socket 22 in its use configuration proximate the front end portion 16 of the shaft 12. The socket positioning assembly 14 also includes a socket retainer 34 that is configured to retain at least the second socket 24 in its storage configuration on the shaft 12. As shown in FIGS. 4A-6, the storage configuration of the socket 22, 24 is between the socket retainer 34 and the rear end portion 18 (or the circumferential groove 20) of the shaft 12. The socket retainer 34 is positioned between the first socket 22 and the second socket 24.

The hand tool is not shown here but the hand tool may generally include a handle for a user to grasp (e.g., that ensures the hand tool does not slip) and a body having an opening configured to receive the shaft 12 therein. A portion of the hand tool body may include a lock configured to releasably engage with the circumferential groove 20 on the rear end portion 18 of the shaft 12. The lock may include one or more detent balls or pins that are positioned within a hollow, cylinder-shaped hand tool body. The one or more detent balls or pins are spring/resiliently biased into engagement with the circumferential groove 20 on the rear end portion 18 of the shaft 12. The lock, in another exemplary embodiment, may include a spring biased clip that is spring/resiliently biased into engagement with the circumferential groove 20 on the rear end portion 18 of the shaft 12.

FIG. 1A shows an exemplary power tool 1000, e.g., an impact driver, a drill, or a drill/driver. As a person of ordinary skill in the art would readily appreciate, the power tool 1000 may include a housing 1012 having a handle 1018 and a trigger mechanism 1016 for activating the power tool 1000. The housing 1012 is adapted to receive a battery pack 1020 for use as a cordless power tool. It should be understood that the power tool 1000 can also be pneumatic, hydraulic and corded electrical power tool. The power tool 1000 may be a portable device.

In one embodiment, the power tool 1000 may include a motor 1014 and a transmission 1016 disposed in the housing 1012. The motor 1014 and the transmission 1016 are configured to provide a torque to an output shaft 1013. In one embodiment, a motor output shaft extends from the motor 1014 to the transmission 1015, which transmits power from the motor output shaft to the output shaft 1013 and to a tool holder 1026. The power tool 1000 may also include a gear assembly and the output of the motor 1014 is coupled to the gear assembly.

In another embodiment, the power tool 1000 may be an impact driver. For example, the motor 1014 may be configured to drive an impact mechanism 1024 that engages the output shaft/anvil 1013 that extends from the front end of the housing 1012. The gear assembly is configured to transfer the output of the motor 1014 to a shaft that in turn drives the impact mechanism 1024. The power tool 1000 is configured to deliver high torque output with minimal exertion by a user, by storing energy in a rotating mass, then delivering it suddenly to the output shaft (e.g., the anvil) 1013. That is, in operation, a rotating mass is accelerated by the motor 1014, storing energy, then suddenly connected to the output shaft (e.g., the anvil) 1013, creating a high-torque impact.

The output shaft 1013 of the power tool 1000 is proximate a front end of the housing 1012 and is coupled/connected to the tool holder 1026 for holding a power tool accessory, e.g., tool bit or the elongated shaft 12 of the present patent application. That is, the chuck assembly or tool/bit holder 1026 is provided to connect the elongated shaft 12 to the power tool 1000 or the hand tool. The output shaft 1013 of the power tool 1000 is configured to rotationally drive the tool holder 1026 that is configured to receive the elongated shaft 12 therein. In other words, the chuck assembly or tool/bit holder 1026 may be attachable to the power tool 1000 or the hand tool to be driven for rotation about an axis (e.g., see 1022 in FIG. 1A). The tool holder 1026 may be a keyless chuck, although it should be understood that the tool holder 1026 can have other tool holder configurations such as a quick release tool holder, a hex tool holder, or a keyed tool holder/chuck. The tool holder 1026 may be interchangeably referred to as an end effector, a chuck, etc. An exemplary bit holder 1026 for the power tool 1000 is disclosed in U.S. Pat. No. 8,622,401, which is incorporated by reference in its entirety.

The chuck assembly or tool/bit holder 1026 is configured to removably receive the elongated shaft 12 of the tool 10 of the present patent application. The chuck assembly or tool/bit holder 1026 may include a lock configured to engage with the circumferential groove 20 on the rear end portion 18 of the shaft 12. The lock may include one or more detent balls or pins that are positioned within a hollow, cylinder-shaped body and are spring/resiliently biased into engagement with the circumferential groove 20 on the rear end portion 18 of the shaft 12. The lock, in another exemplary embodiment, may include a spring biased clip that is spring/resiliently biased into engagement with the circumferential groove 20 on the rear end portion 18 of the shaft 12.

A person of ordinary skill in in the art will understand that several of the components of the power tool 1000 are conventional in nature and therefore need not be discussed in significant detail in the present patent application.

In one embodiment, the present patent application provides a double-ended detachable socket adapter system 10 with on tool storage. For example, the present patent application provides a socket driver extension having the hex shaft 12 with the front end portion 16 with a radial spring biased ball 48 and a fixed magnet 38, the rear end portion 18 with the annular groove 20, and an intermediate portion with the collar 14 fixed to the hex shaft 12. The collar 14 has a front end with an outer flange 72 and an inner flange 76 and a rear end with a ring magnet 66. The hex shaft 12 can carry two double ended sockets 22, 24. The working socket 22 that is in use is carried on the front end 18 of the hex shaft 12 with the spring biased ball 48 engaging an internal groove or recess inside the socket 22 and the rear end of the socket 22 abutting either the inner flange 72 or the outer flange 76 on the collar 14. In one embodiment, the inner and outer flange 72 and 76 of the socket support member 32 includes with different depths for abutting different diameter socket ends. The tool 10 allows for an additional socket to be installed onto the shank 12 between the socket retainer 34 (or the flange) and the circumferential groove 20. The second socket 24 that is not in use is carried behind the collar 14 and is held in place by the ring magnet 66 on the rear of the collar 14. The embodiment with the ring magnet 66 (as shown in FIGS. 1-5, 6 and 8) shows a method of including a park position for the socket that does not reduce cross sectional area of the tool and therefore provide a tool with maximum torque (no reduction in torque compared with one-piece drivers) with the smallest outer diameter. In one embodiment, with the ring magnet embodiment, the second socket in its parking position is not required to maintain maximum torque rating. In one embodiment, the front/working socket 22 is configured to work with a ball and spring arrangement and, because of this, the front/working socket bridges across the weak region of the shaft.

In one embodiment, the elongated shaft 12 is a socket driver extension or a socket driver tool. The elongated shaft 12 may interchangeably referred to as a shank. The shaft 12 has a hexagonal shaped configuration. The shaft 12 may have other polygonal shaped configuration. The shaft 12 has the front end portion 16 and the opposing rear end portion 18. The front end portion 16 of the shaft 12 may be referred to as socket mounting end. The front end portion 16 of the shaft 12 includes a fastener retainer receiving portion 36 that is configured to receive a fastener retainer 38. The fastener retainer 38 includes a magnet member 38 that is configured to apply magnetic force to retain a fastener (e.g., hex head fasteners including (self-tapping) hex head screws, hex head bolts, etc.) received in a fastener receiving opening 58 when the socket 22 is in its use configuration (e.g., as shown in FIG. 5).

Figure 5:
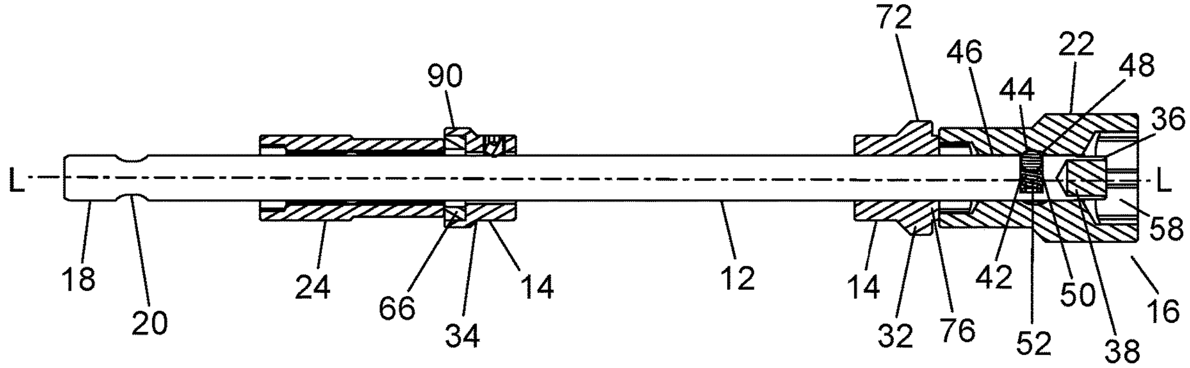
FIG. 5 shows a cross-sectional view of the socket driver tool with the socket positioning assembly and at least two sockets disposed thereon according to an embodiment of the present patent application, where the socket support member and the socket retainer of the socket positioning assembly are positioned at axially separated positions along the longitudinal axis of the socket driver tool in FIGS. 4A, 4B and 5.

The front end portion 16 of the shaft 12 also includes a lock 42 that is configured to engage with a lock engagement portion 44 (as shown in FIG. 5) disposed on an inner surface 46 of the socket 22 so as to selectively releasably connect the socket 22 to the shaft 12 in either a first use configuration or a second use configuration. Each socket generally includes the first use configuration and the second use configuration as will be described in detail in the discussions below.

In one embodiment, the lock 42 of the shaft 12 includes a lock member 48 (e.g., lock ball 48 or lock pin) that is positioned within a hollow, cylinder-shaped lock receiving portion 50 in the shaft 12 and is biased by a spring 52. That is, the lock member 48 is spring/resiliently biased into engagement with the lock engagement portion 44 (as shown in FIG. 5) disposed on the inner surface 46 of the socket 22 so as to selectively releasably connect the socket 22 to the shaft 12 in either the first use configuration or the second use configuration. In one embodiment, the lock member/ball 48 is trapped via staking.

The rear end portion 18 of the shaft 12 may be referred to as (e.g., hand or power) tool mounting end. The rear end portion 18 has the circumferential groove 20 for mounting the shaft 12 for rotation by the hand tool or the power tool 1000. The circumferential groove 20 may be interchangeably referred to as annular groove. The circumferential groove 20 has a predetermined size/radius so as to be able to capture the lock (e.g., in an extended position where the lock protrudes beyond an inner surface) of the power tool or the hand tool.

In one embodiment, as shown and explained in detail with respect to FIGS. 15-23, the shaft 12 may also include an intermediate portion that has a cylindrical shaped configuration.

Figure 21:
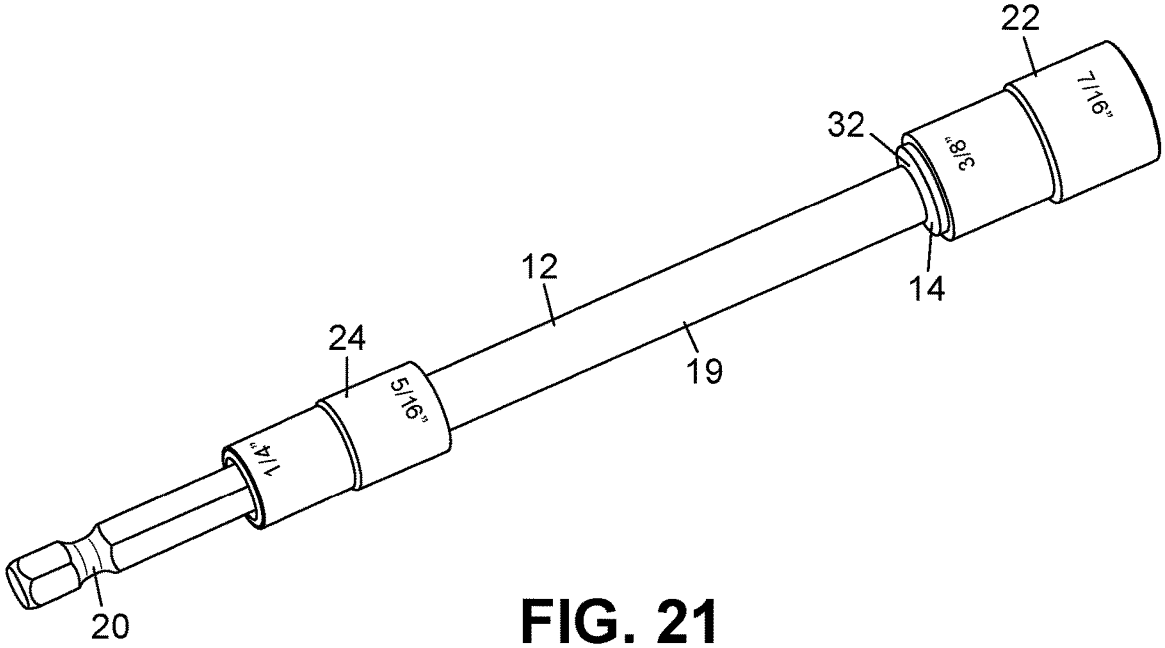
FIG. 21 shows the socket driver tool with the socket positioning assembly and the at least two sockets disposed thereon according to an embodiment of the present patent application, where the parking socket in FIGS. 18 and 19 is being used as the working socket in FIG. 21 and the working socket in FIGS. 18 and 19 is being stored as the parking socket on the socket driver tool of FIG. 21.
Figure 23:
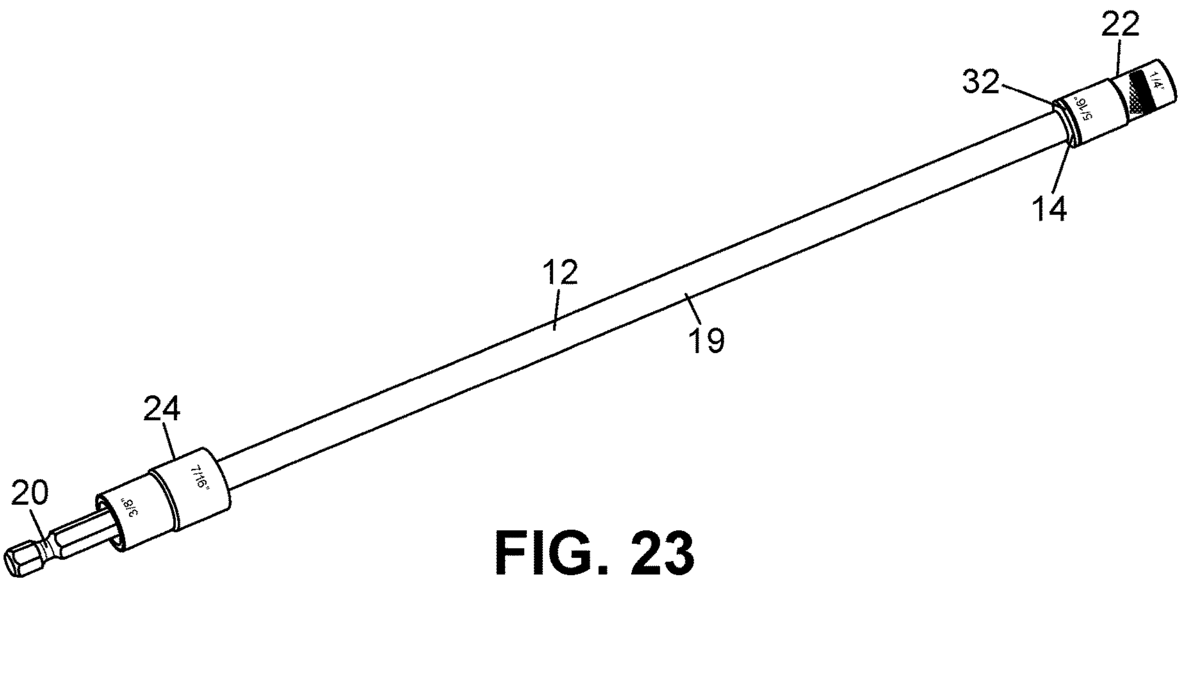
FIG. 23 shows the socket driver tool with the socket positioning assembly and the at least two sockets disposed thereon according to another embodiment of the present patent application.

In one embodiment, the shaft 12 is a ¼ inch hex shank. The shaft 12 may have various lengths depending on the particular use. In one embodiment, the shaft 12 has a length of 6 inches (e.g., as shown in FIG. 21). In another embodiment, the shaft has a length of 12 inches (e.g., as shown in FIG. 23). In one embodiment, a portion (e.g., 26.05 mm) of the shank 12 is exposed on the rear end portion 18 of the shank 12 to lock the shank 12 in the impact driver/drill driver/hand tool.

The shaft 12 may be made from conventional durable and sturdy material such as stainless steel, tool steel or tool alloys such as chrome vanadium, which does not rust. The shaft 12 may be fabricated by a wide variety of conventional metal working techniques, including but not limited to extruding, machining, casting, forging, welding and combinations of these techniques.

Figure 7:
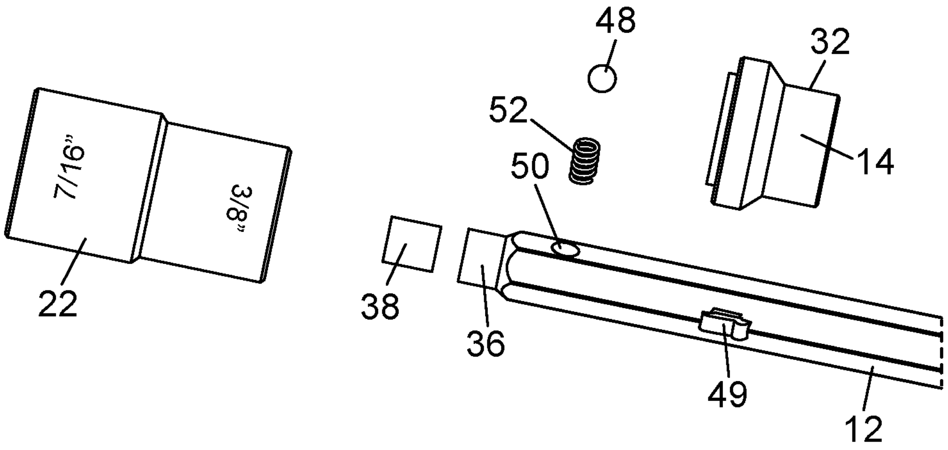
FIG. 7 shows a partial exploded view (e.g., a front portion) of the socket driver tool along with the socket support member of the socket positioning assembly and a working socket according to an embodiment of the present patent application.

The shaft 12 may include a stamped feature 49 (as shown in FIG. 7) that is configured to engage with the socket support member 32 to position the socket support member 32 on the shaft 12. In one embodiment, the shaft 12 may include a stamped feature configured to engage with the socket retainer 34 to position the socket retainer 34 on the shaft 12.

Figure 24:
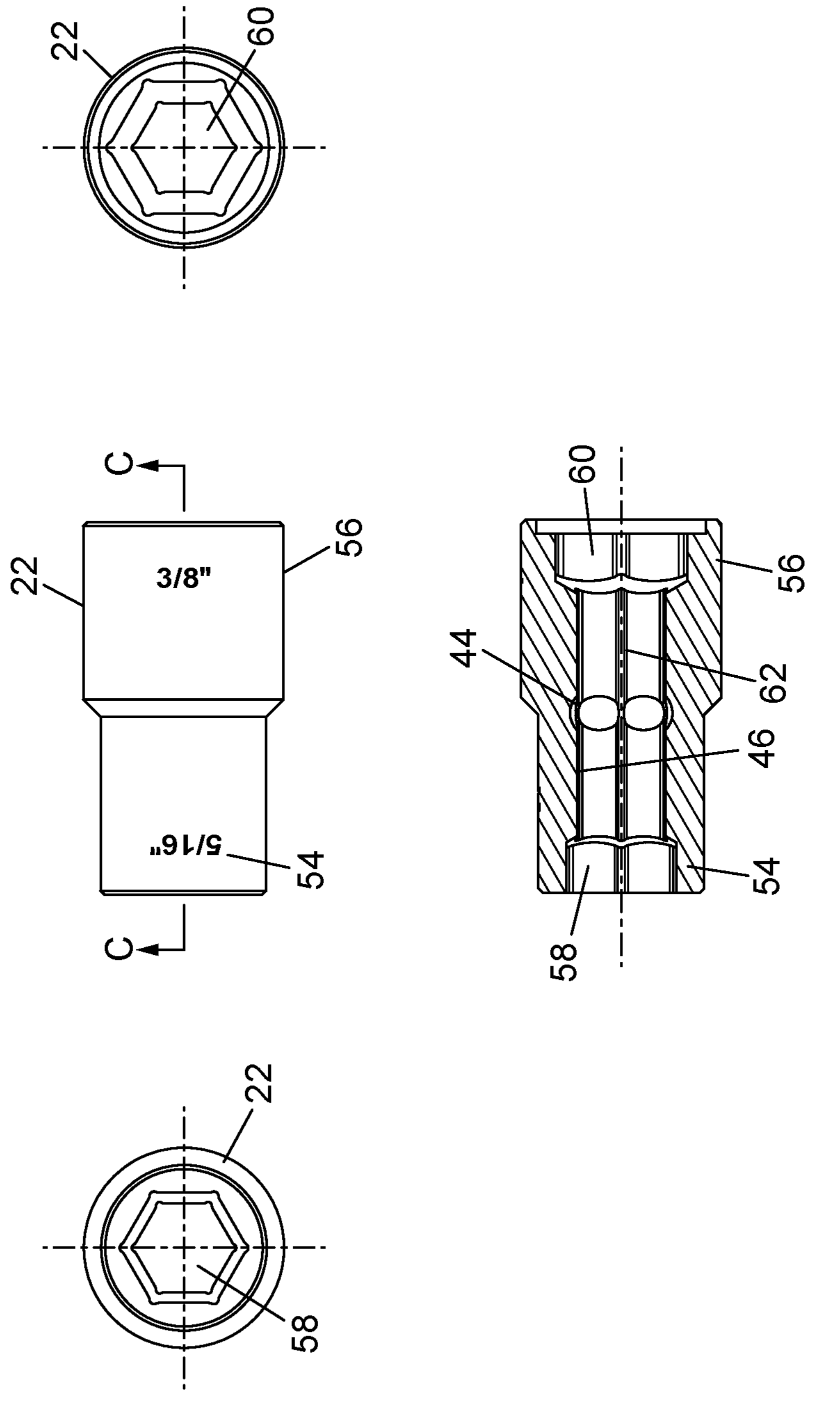
FIGS. 24-27 show various views of different exemplary sockets that can are used with the socket driver tool according to an embodiment of the present patent application.
Figure 25:
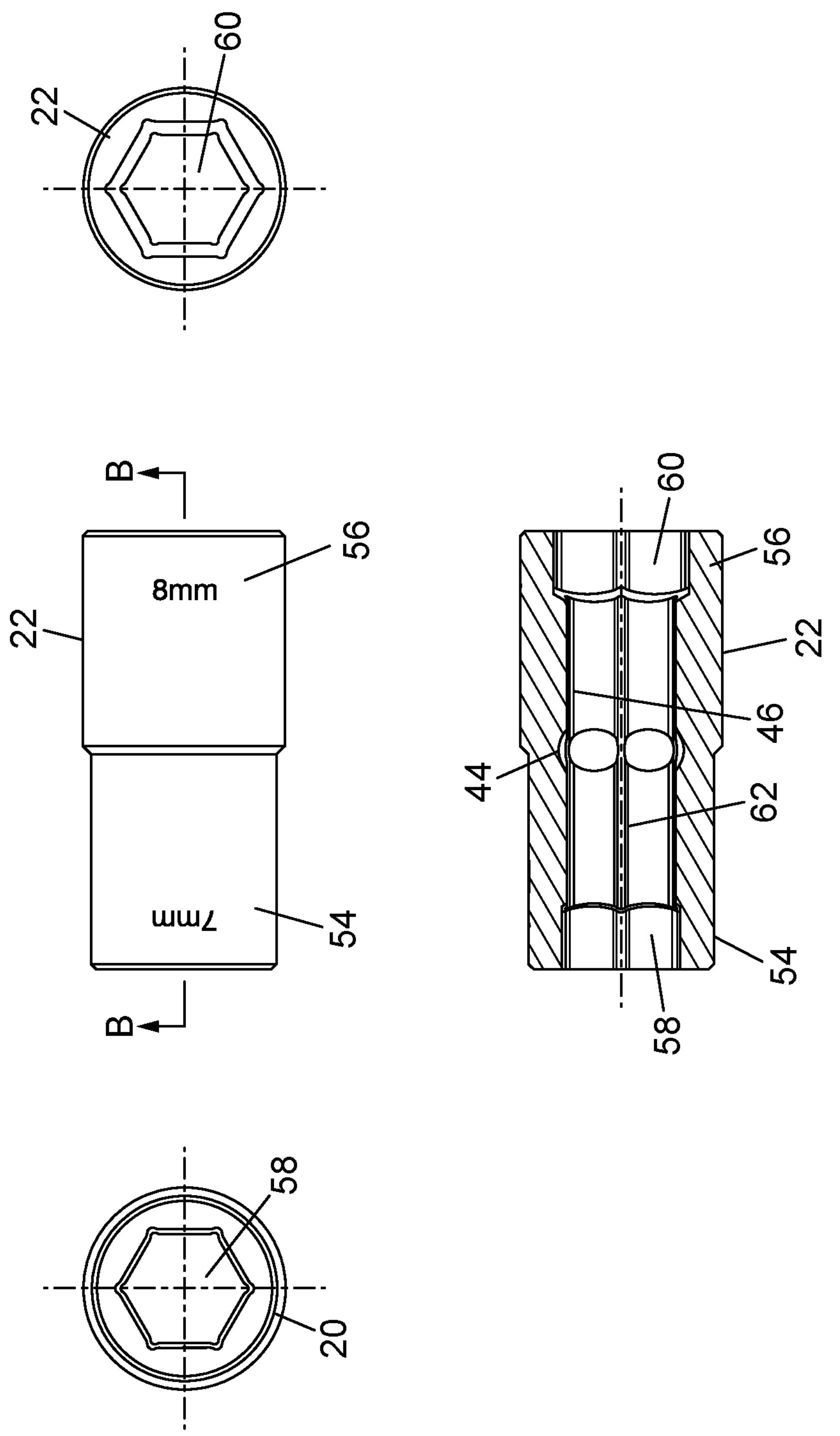
Figure 26:
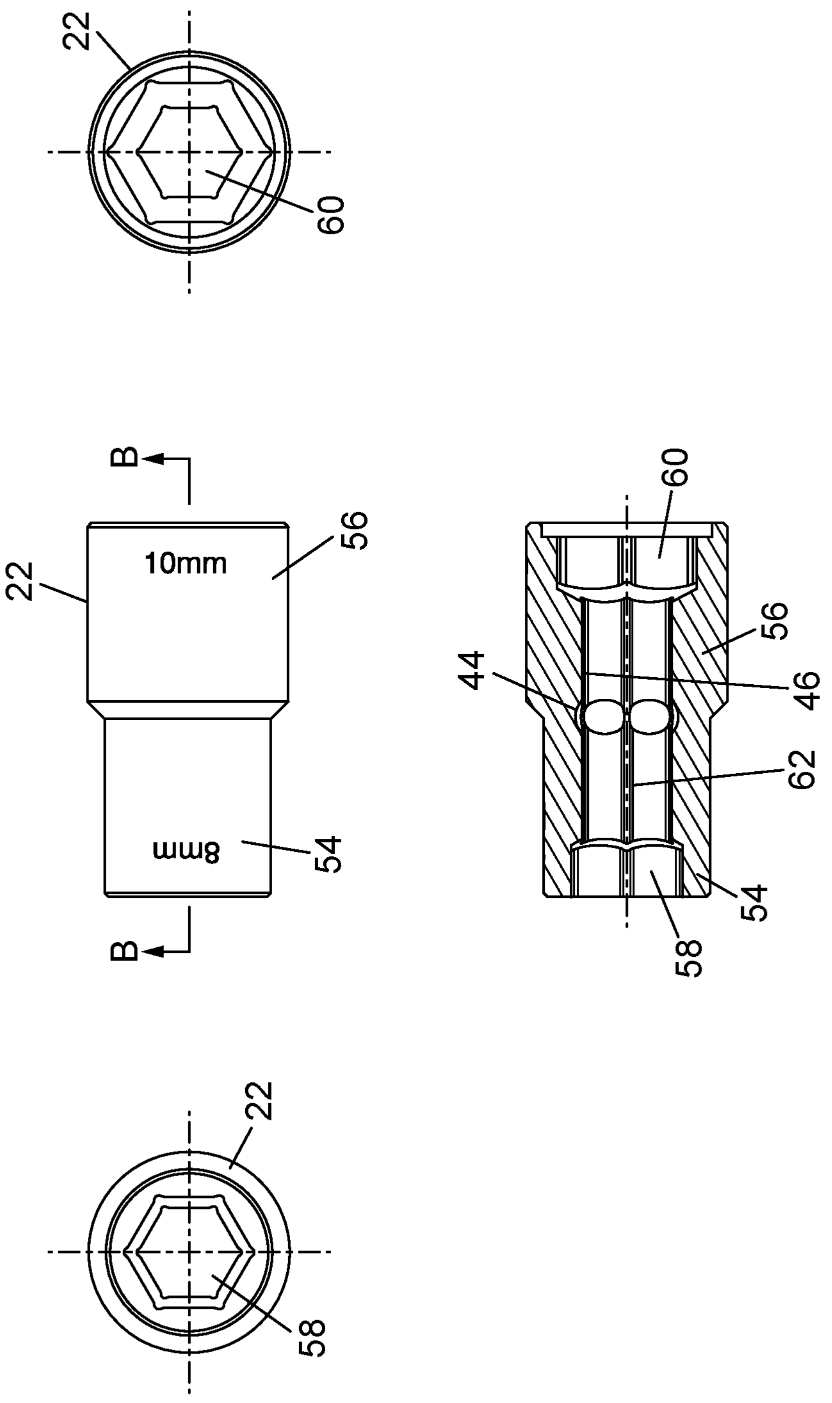
Figure 27:
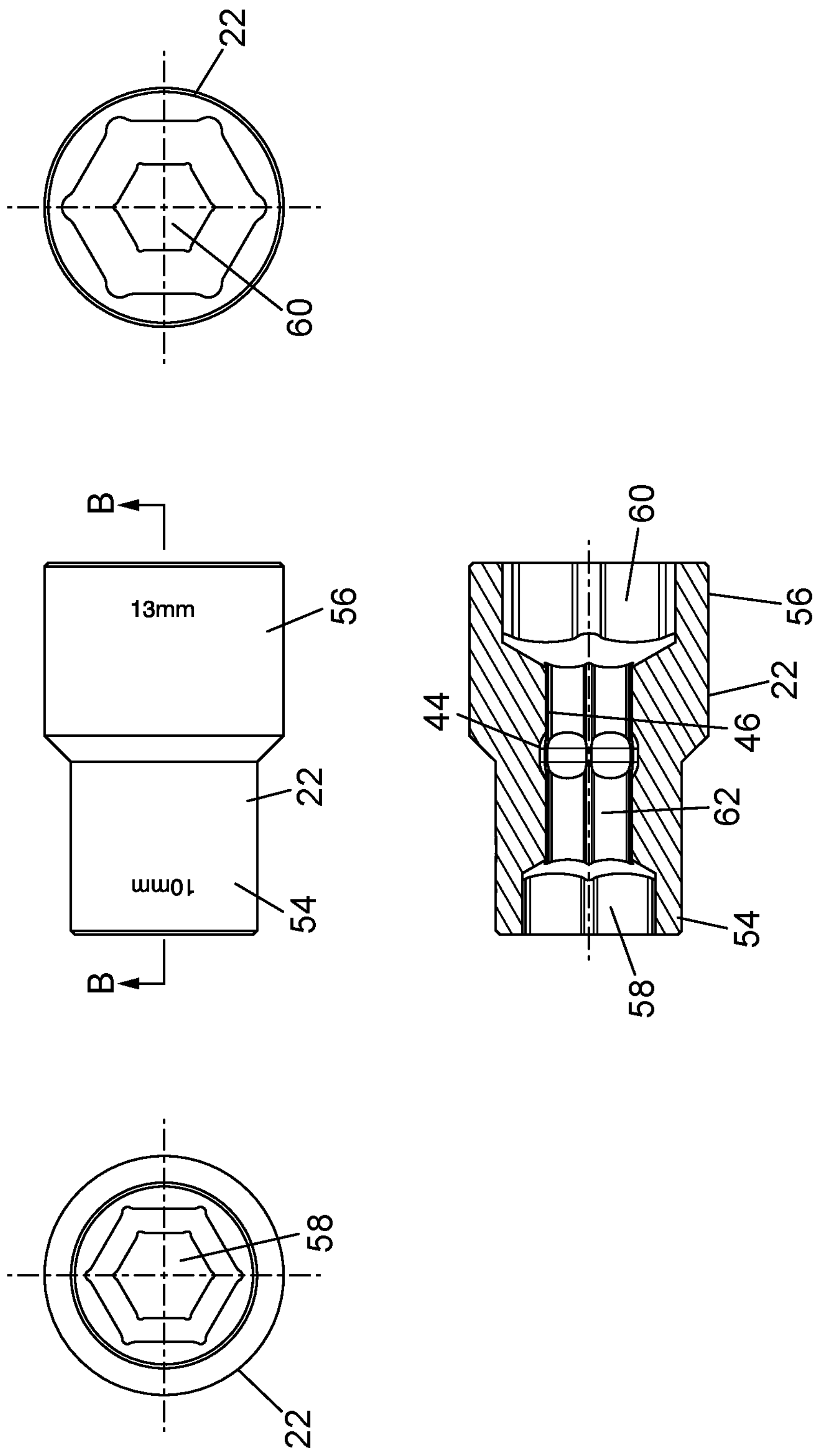

Each of the sockets 22-30, shown in FIGS. 1B and 24-27, is a double-ended socket that is configured to provide different sized fastener receiving openings at its ends. As shown in FIG. 1B, the shaft 12 is configured to support any of these exemplary sockets, including but not limited to, the socket 22 with 7/16 inch and 9/16 inch fastener receiving openings, the socket 24 with ⅜ inch and 5/16 inch fastener receiving openings, the socket 26 with 7 millimeter (mm) and 8 mm fastener receiving openings, the socket 28 with 10 mm and 8 mm fastener receiving openings, and the socket 30 with 10 mm and 13 mm fastener receiving openings. Each of the FIGS. 24-27 show different views of the sockets that are configured to be supported on the shaft 12. For example, FIG. 24 shows different views of the socket 24 with ⅜ inch and 5/16 inch fastener receiving openings. FIG. 25 shows different views of the socket 26 with 7 mm and 8 mm fastener receiving openings. FIG. 26 shows different views of the socket 28 with 10 mm and 8 mm fastener receiving openings. FIG. 27 shows different views of the socket 30 with 10 mm and 13 mm fastener receiving openings. These sockets are just a few exemplary sockets that are configured to be supported by the shaft 12. The shaft 12 is also configured to support other sockets that are not specifically discussed in this present patent application.

Although each of the sockets 22-30, shown in FIGS. 1B and 24-27, is dimensionally different from the other sockets, each of the sockets 22-30 is both materially and structurally similar to the other sockets. Therefore, the material properties and the structural configuration of only one socket (e.g., socket 22) is described in detail here.

The socket 22 may be made of alloy steel material. The socket 22 may be made of AISI (American Iron and Steel Institute) 6150 (e.g., annealed hot rolled (HR)) alloy steel material, which is a fine grained, highly abrasion resistant carbon-chromium alloy steel. The socket 22 may be made of 50CrVA structural steel and alloy steel material. The socket 22 may have a black phosphate manganese finish. The socket 22 may be hardened and tempered. The socket 22 may be made in accordance with a process specification of PS1000. The socket 22 may be made in accordance with an engineering specification of ES100118. The socket 22 may have hardness of Rockwell C scale of 50-54 HRC. The socket 22 may be configured to withstand a minimum torque of 70 feet-pounds.

Figure 5A:
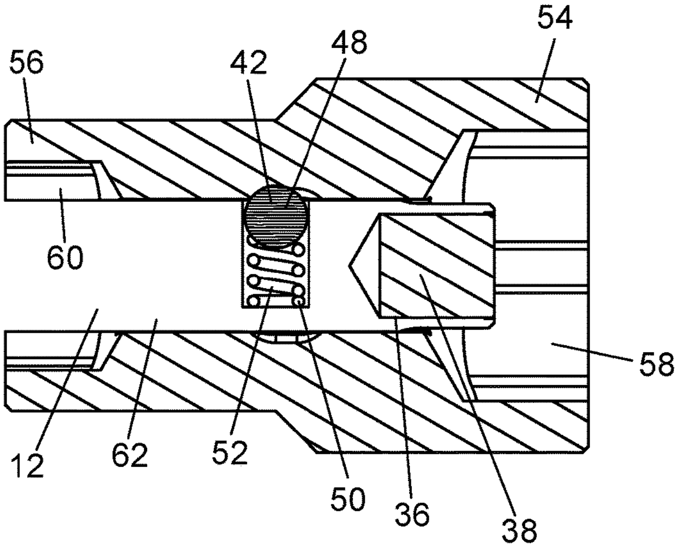
FIG. 5A shows a cross-sectional view of a socket according to an embodiment of the present patent application, where portions of the shaft including a lock and a fastener retainer of the shaft are shown in this figure but other portions of the shaft are not shown to better illustrate other portions of the tool.
Figure 6:
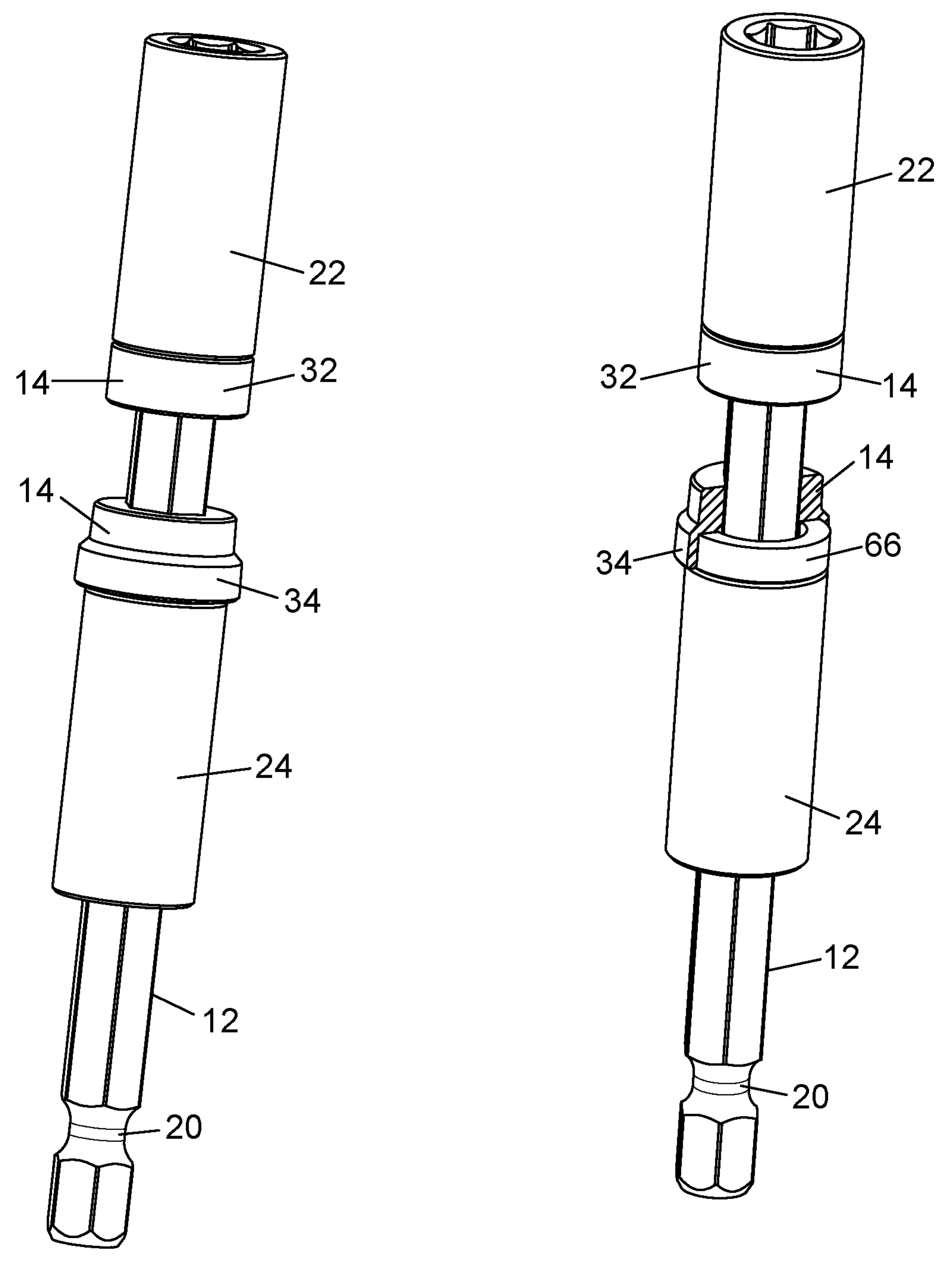
FIG. 6 shows yet another view of the socket driver tool with the socket positioning assembly and the at least two sockets disposed thereon according to an embodiment of the present patent application.

Referring to FIG. 5A, the socket 22 has a first end 54 and a second end 56. The first end 54 of the socket 22 has a first fastener driving opening 58. The second end 56 of the socket 22 has a second fastener driving opening 60.

The socket 22 may generally include a first diameter portion with a first end and a second end and a second diameter portion with a first end and a second end. The second diameter portion is adjacent to the first diameter portion such that the second end of the first diameter portion is adjacent to the first end of the second diameter portion. The first fastener driving opening 58 is at the first end of the first diameter portion and the second fastener driving opening 60 is at the second end of the second diameter portion. The socket 22 may include an intermediate transition portion disposed between the first diameter portion and the second diameter portion.

The first fastener driving opening 58 and the second fastener driving opening 60 of the socket 22 have different sizes. In one embodiment, the first fastener driving opening is smaller in size than the second fastener driving opening. In another embodiment, the first fastener driving opening is larger in size than the second fastener driving opening. The first fastener driving opening and the second fastener driving opening are hex shaped openings. The first fastener driving opening and the second fastener driving opening may have other polygon shaped openings. In one embodiment, the fastener receiving openings 58, 60 of the socket 22 are 7⁄16 inch and 9⁄16 inch. In another embodiment, the fastener receiving openings 58, 60 of the socket 22 are 3⁄8 inch and 5⁄16 inch. In yet another embodiment, the fastener receiving openings 58, 60 of the socket 22 are 7 mm and 8 mm. In yet another embodiment, the fastener receiving openings 58, 60 of the socket 22 are 8 mm and 10 mm. In yet another embodiment, the fastener receiving openings 58, 60 of the socket 22 are 10 mm and 13 mm.

Figure 10:
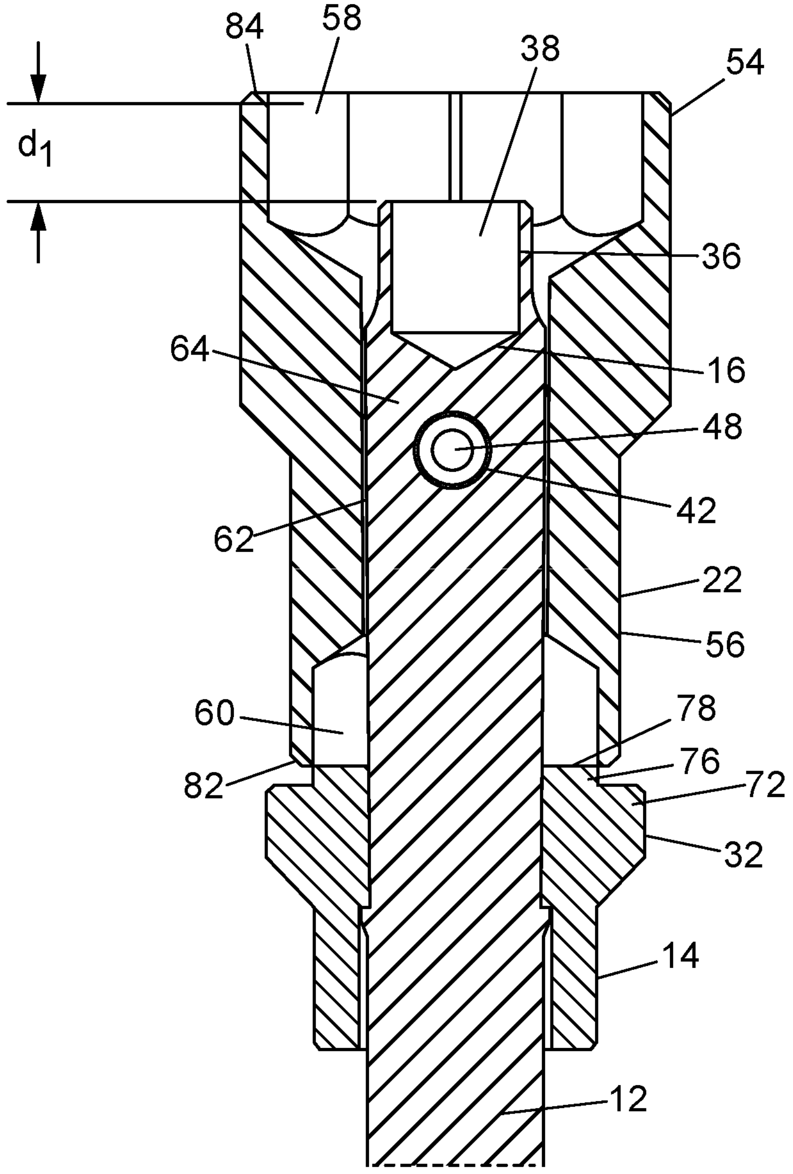
FIG. 10 shows a partial cross-sectional view (e.g., the front portion) of the socket driver tool, where the first end of the working socket is being supported by the socket support member of the socket positioning assembly according to an embodiment of the present patent application.
Figure 12:
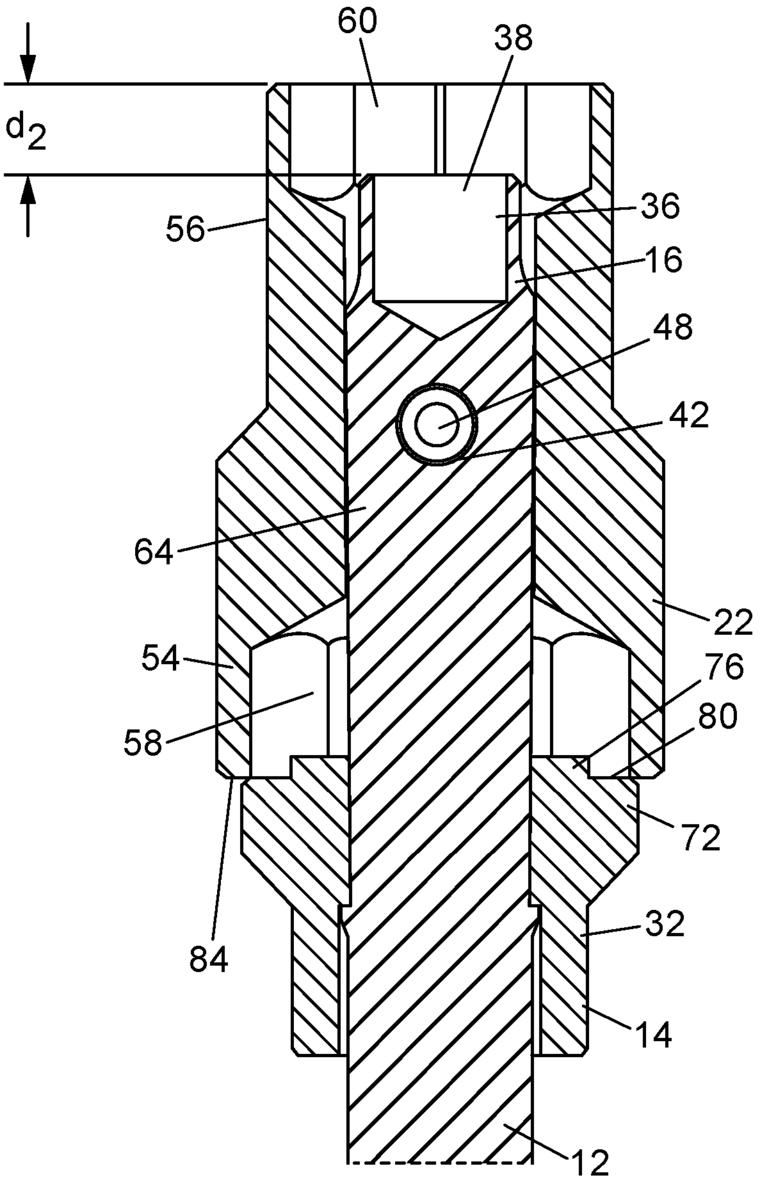
FIG. 12 shows a partial cross-sectional view (e.g., the front portion) of the socket driver tool, where the second end of the working socket is being supported by the socket support member of the socket positioning assembly according to an embodiment of the present patent application.

The socket 22 also includes a shaft opening 62 therethrough. The shaft opening 62 connects the first fastener driving opening 58 and the second fastener driving opening 60. The shaft opening 60 is configured to receive a shaft portion 64 (as shown in FIGS. 10 and 12) of the shaft 12 therein when the socket 22 is either in its first use configuration (as shown in FIG. 10) or in its second use configuration (as shown in FIG. 12). In one embodiment, the lock 42 of the shaft 12 is positioned in the shaft portion 64 of the shaft 12. As discussed in detail in the discussions above, the lock 42 of the shaft 12 is configured to engage with the lock engagement portion 44 (as shown in FIG. 5) disposed on the inner surface 46 of the socket 22 so as to selectively releasably connect the socket 22 to the shaft 12 in either the first use configuration or the second use configuration. The inner surface 46 of the socket 22 is shaped and configured to engage/surround an outer surface of the shaft portion 64 of the shaft 12. The lock engagement portion 44, disposed on the inner surface 46 of the socket 22, may be a (e.g., circumferential or annular) groove or channel that is configured to axially lock the lock member 48 of the shaft 12.

The socket 22 is configured to be selectively positionable on the shaft 12 in either a use configuration or in a storage configuration. The socket 22 includes at least one use configuration. The socket 22 includes two use configurations. For example, the (working) socket 22, connected at the front portion 16, can be removed from the tool, flipped and connected back to the tool at the front portion as explained below in detail in the discussions below with respect to FIG. 16-23. Thus, the tool has two use configurations for the socket 22 (i.e., at one use position, that is, at the front portion 16 on the shaft 12). The socket 22 is configured to be releasably positionable at the front end portion 16 of the shaft 12. The socket 22 is configured to be movable between a first use configuration (see FIGS. 9 and 10) in which the first fastener driving opening 58 is positioned to receive a first fastener and a second use configuration (see FIGS. 11 and 12) in which the second fastener driving opening 60 is positioned to receive a second fastener. The first fastener driving opening 58 and the first fastener have same shape and configurations. The second fastener driving opening 60 and the second fastener have same shape and configurations. The first fastener and the second fastener have different sizes. The first fastener and the second fastener are hex or other polygon shaped fasteners. In one embodiment, the first fastener is smaller in size than the second fastener. In another embodiment, the first fastener is larger in size than the second fastener.

The socket 22 also includes at least one storage configuration on the shaft 12 and between the socket retainer 34 and the circumferential groove 20. For example, the (parking) socket 22 can be removed from the tool, flipped and connected back to the tool (i.e., disposed between the socket retainer 34 and the circumferential groove 20) as explained below in detail in the discussions below with respect to FIG. 16-23. Thus, the tool has two storage configurations for the (parking) socket 22 (i.e., at the one storage position on the shaft 12 that is disposed between the socket retainer 34 and the circumferential groove 20). The socket 22 includes two storage configurations. The socket 22 is configured to be releasably positionable on the shaft 12 and movable between a first storage configuration in which the first fastener driving opening 58 is positioned adjacent to the socket retainer 34 and a second storage configuration the second fastener driving opening 60 is positioned adjacent to the socket retainer 34. In one embodiment, the storage configuration in which the smaller of the fastener receiving openings is positioned adjacent to the socket retainer 34 is used because a magnet member 66 of the socket retainer 34 can apply more magnetic force on the smaller sized end of the socket 22 (i.e., having the smaller fastener receiving opening). The storage configurations are between the socket retainer 34 and the circumferential groove 20 of the shaft 12.

At the second end 56, the socket 22 includes a transversely extending surface 82 that surround the second fastener driving opening 60 and that is perpendicular to the longitudinal axis L-L of the shaft 12. This transversely extending surface 82 is supported by or is abutting a surface 78 of an inner flange 76 of the socket support member 32 when the first socket 22 in its first use configuration as shown in and discussed in detail below with respect to FIGS. 9 and 10.

At the first end 54, the socket 22 includes a transversely extending surface 84 that surround the first fastener driving opening 58 and that is perpendicular to the longitudinal axis L-L of the shaft 12. This transversely extending surface 84 is supported by or is abutting a surface 80 of an outer flange 72 of the socket support member 32 when the first socket 22 in its second use configuration as shown in and discussed in detail below with respect to FIGS. 11 and 12.

The shaft 12 is configured to support at least two sockets 22-30 (as shown in FIG. 1B), including the first socket 22 and the second socket 24. In one embodiment, the shaft 12 is configured to support two sockets thereon. That is, the shaft 12 is configured to support the first socket 22, in its use configuration, at the front end portion 16 of the shaft 12 and to support the second socket 24, in its storage configuration, on the shaft 12 between the socket retainer 34 and the circumferential groove 20. In another embodiment, the shaft 12 is configured to support three sockets thereon. That is, the shaft 12 is configured to support the first socket 22, in its use configuration, at the front end portion 16 of the shaft 12 and to support the second socket 24 and a third socket 26, in their storage configurations, on the shaft 12 between the socket retainer 34 and the circumferential groove 20. In yet another embodiment, the shaft 12 is configured to support four sockets thereon. That is, the shaft 12 is configured to support the first socket 22, in its use configuration, at the front end portion 16 of the shaft 12 and to support the second socket 24, the third socket 26 and a fourth socket 28, in their storage configurations, on the shaft 12 between the socket retainer 34 and the circumferential groove 20.

The socket 22 that is supported in the front end portion 16 of the shaft 12 may be interchangeably referred to as the working socket. As will be explained in detail in the discussions below, the (working) socket 22 supported in the front end portion 16 of the shaft 12 includes a first use configuration and a second use configuration. The sockets 24, 26, or 28 supported in their storage configurations on the shaft 12 and between the socket retainer 34 and the circumferential groove 20 may be interchangeably referred to as the parking socket(s). That is, the socket may be referred to as the working socket when it is supported in the front end portion 16 of the shaft 12 and the same socket may be referred to as the parking socket when disposed in the intermediate/rear portion of the shaft and retained between the socket retainer 34 and the circumferential groove 20.

In one embodiment, the socket retainer 34 is configured to retain only the first (i.e., positioned adjacent to the socket retainer 34) of the at least two parking sockets, in its storage configuration on the shaft 12, where the storage configuration being between the socket retainer 34 and the circumferential groove 20 of the shaft 12. In such an embodiment, the rest of the at least two parking sockets are retained in their storage configurations on the shaft 12 in an internesting stacking relationship with the adjacent parking sockets. In one embodiment, the socket retainer 34 is configured to retain all of the at least two parking sockets, in their storage configurations on the shaft 12, where the storage configurations are between the socket retainer 34 and the circumferential groove 20 of the shaft 12.

The socket 22 may include a magnet (not shown) therein that is configured to retain the socket 22 on the shaft 12 when the socket 22 is in its parking position. The magnet may be a ring magnet. The magnet may be a circumferential or annular magnet member. The magnet is configured to apply magnetic force to retain the socket 22 on the shaft 12 when the socket 22 is in its parking position. The magnet of the socket 22 is configured to work independently and/or in combination with the magnet/retainer of the socket retainer 34 to retain the socket 22 on the shaft 12. For example, the first (i.e., positioned adjacent to the socket retainer 34) of the at least two parking sockets, in its storage configuration on the shaft 12, is retained between the socket retainer 34 and the circumferential groove 20 of the shaft 12 by both the magnetic force of the magnet of the socket 22 and the force applied by the magnet/retainer of the socket retainer 34. The rest of the at least two parking sockets are retained in their storage configurations on the shaft 12 between the socket retainer 34 and the circumferential groove 20 of the shaft 12 by the magnetic forces of each of the rest of the at least two parking sockets.

The magnet of the socket 22 may also be configured to retain the socket 22 on the shaft 12 when the socket 22 is in its use configuration. The magnet of the socket 22 is configured to work independently and/or in combination with the lock 42 of the shaft 12 to selectively releasably connect the socket 22 to the shaft 12 in either the first use configuration or the second use configuration.

The tool 10 includes the socket positioning assembly 14 disposed on the shaft 12. The socket positioning assembly 14 includes the socket support member 32 that is configured to support the first socket 22 in its use configuration (as shown in FIGS. 4A and 4B) at the front end portion 16 of the shaft 12, and the socket retainer 34 that is configured to retain at least the second socket 24 in its storage configuration (as shown in FIGS. 4A and 4B) on the shaft 12.

Figure 2:
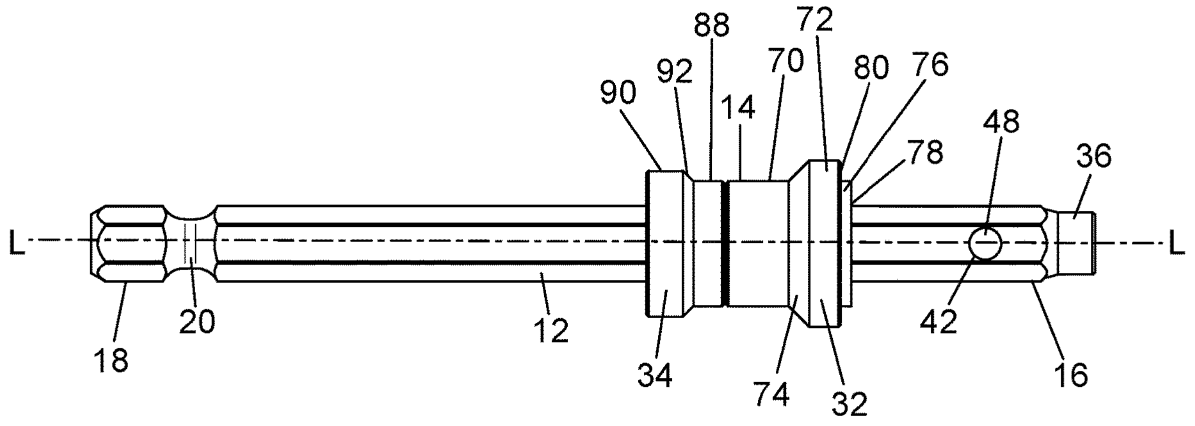
FIG. 2 shows the socket driver tool having a socket positioning assembly disposed thereon according to an embodiment of the present patent application.
Figure 3:
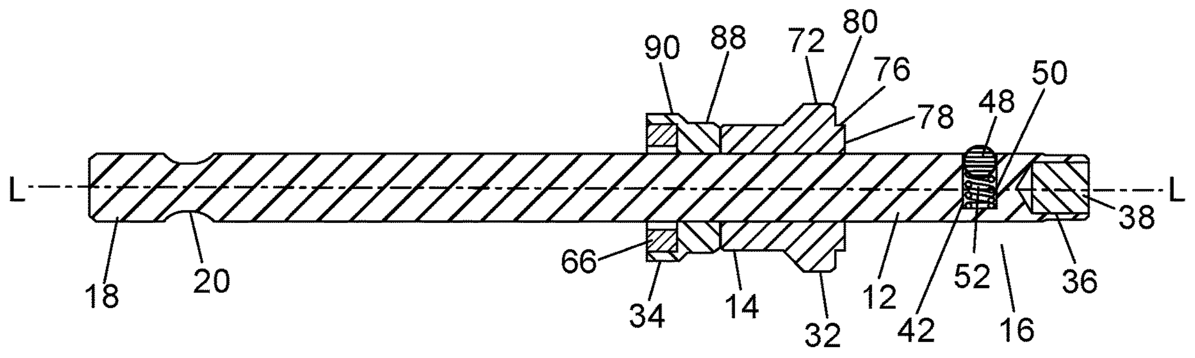
FIG. 3 shows a cross-sectional view of the socket driver tool and the socket positioning assembly disposed thereon according to an embodiment of the present patent application, where a socket support member and a socket retainer of the socket positioning assembly are positioned axially adjacent to each other along a longitudinal axis of the tool in FIGS. 2 and 3.
Figure 4A:
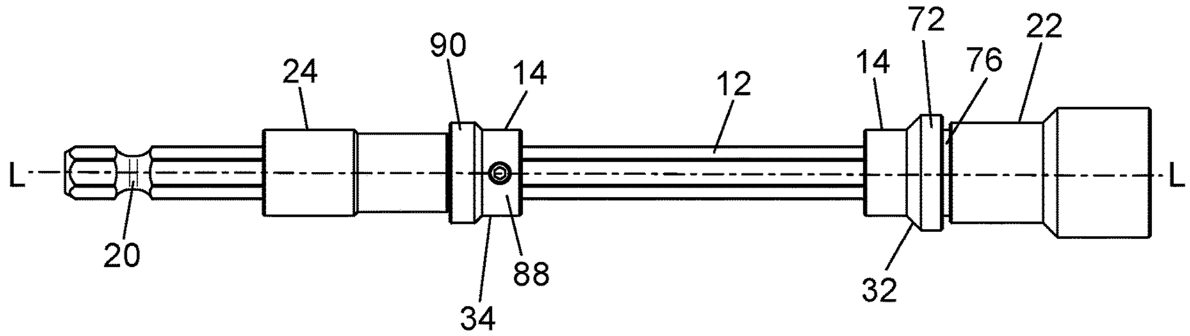
FIGS. 4A and 4B show another view of the socket driver tool with the socket positioning assembly and at least two sockets disposed thereon according to an embodiment of the present patent application.
Figure 4B:
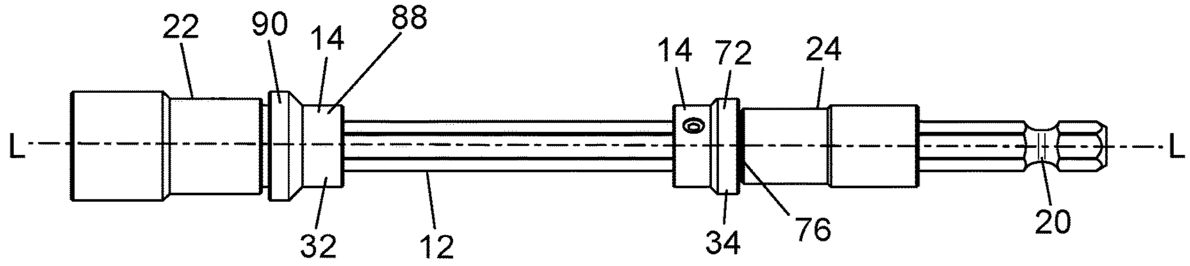

In one embodiment, as shown in FIGS. 4A, 4B, and 5, the socket retainer 34 and the socket support member 32 are disposed at axially separated positions along a longitudinal axis L-L of the shaft 12. This may be the configuration for longer lengths of the shaft 12. In another embodiment, as shown in FIGS. 2-3, the socket retainer 34 and the socket support member 32 are disposed at axially adjacent positions along the longitudinal axis L-L of the shaft 12. This may be the configuration for shorter lengths of the shaft 12.

The socket support member 32 may be fixedly disposed on the shaft 12. The socket support member 32 may be removably disposed on the shaft 12 so it can be moved to different locations/positions on the shaft 12 (e.g., to position the socket support member 32 on the shaft 12 at a new location/position) as desired. The socket support member 32 may include a stamped feature receiving portion on an inner surface thereof. The stamped feature receiving portion is configured to receive or engage with the stamped feature 49 (see FIG. 7) on the shaft 12 to position the socket support member 32 on the shaft 12. In another embodiment, the socket support member 32 is disposed on the shaft 12 using a fastener (e.g., a headless screw). This embodiment allows the socket support member 32 to be slideable on the shaft 12 and be fixed at a desired location. In yet another embodiment, the socket support member 32 may be glued/adhesively connected to the shaft 12. The socket support member 32 may interchangeably be referred to as a collar.

Referring to FIG. 2, the socket support member 32 may generally include a first diameter portion 70 with a first end and a second end, a second diameter portion 72 with a first end and a second end and an intermediate/transition portion 74 positioned between the second diameter portion and the first diameter portion. The intermediate/transition portion 74 connects a second end of the first diameter portion 70 to a first end of the second diameter portion 72. The second diameter portion 72 is larger in size than the first diameter portion 70. The second diameter portion 72 may interchangeably be referred to as an outer flange 72 or a first support portion 72.

The socket support member 32 may also include a third diameter portion 76 that is positioned adjacent to the second diameter portion 72 such that a first end of the third diameter portion 76 is adjacent to a second end of the second diameter portion 72. The third diameter portion 76 is of the same size as the first diameter portion 70. The third diameter portion 76 may be interchangeably referred to as an inner flange 76 or a second support portion 76.

The first support portion/outer flange 72 and the second support portion/inner flange 76 have different sizes. The first support portion/outer flange 72 is larger in size than the second support portion/inner flange 76. The first support portion/outer flange 72 and the second support portion/inner flange 76 are disposed axially adjacent to each other along the longitudinal axis L-L of the shaft 12.

The socket support member 32 includes a shaft opening therethrough and extending through the intermediate/transition portion, the third diameter portion, the second diameter portion and the first diameter portion. The shaft opening is configured to receive a portion of the shaft 12 therein. The stamped feature 49 (see FIG. 7) of the shaft 12 is positioned in this portion of the shaft 12. The stamped feature 49 of the shaft 12 is configured to engage with or be received in the corresponding stamped feature receiving portion on the inner surface of the socket support member 32 so as to position the socket support member 32 to the shaft 12.

The inner flange 76 and the outer flange 72, each include surfaces 78, 80 that are configured to support the first socket 22 in its use configurations at the front end portion 16 of the shaft 12. For example, these surfaces of the inner flange 76 and the outer flange 72 are transversely extending surfaces that surround their associated shaft openings and are perpendicular to the longitudinal axis L-L of the shaft 12.

Figure 9:
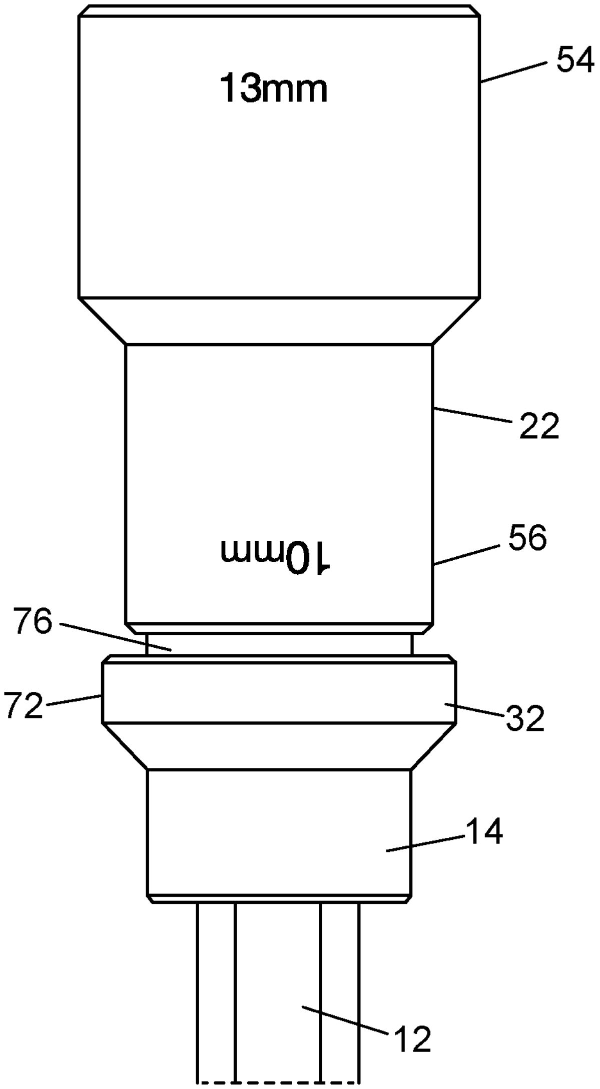
FIG. 9 shows a partial view (e.g., the front portion) of the socket driver tool, where a first end of the working socket is being supported by the socket support member of the socket positioning assembly according to an embodiment of the present patent application.

Referring to FIGS. 9-10, the socket support member 32 is configured to support the first socket 22 in its first use configuration in which the first fastener driving opening 58 is positioned to receive the first fastener. That is, when the socket 22 is in its first use configuration, the second support portion/inner flange 76 is configured to support the second end 56 of the socket 22. The surface 78 of the inner flange 76 of the socket support member 32 is configured to support the first socket 22 in its first use configuration. The transversely extending surface 82 at the second end 56 of the socket 22 is supported by or is abutting the surface 78 of the inner flange 76 when the first socket 22 in its first use configuration.

The first fastener driving opening 58 is larger in size than the second fastener driving opening 60 in FIGS. 9-12. The first fastener is larger in size than the second fastener in FIGS. 9-12.

When the socket 22 is in its first use configuration (as shown in FIGS. 9-10) with the second support portion/inner flange 76 supporting the second end 56 of the socket 22, the fastener retainer 38 of the shaft 12 is configured and positioned in the first fastener driving opening 58 so as to better accommodate the smaller first fastener in the first fastener driving opening 58. Also, when the socket 22 is in its first use configuration with the second support portion/inner flange 76 supporting the second end 56 of the socket 22, the fastener retainer 38 of the shaft 12 is also configured to apply (e.g., magnetic) force to retain the first fastener received in the first fastener driving opening 58.

Figure 11:
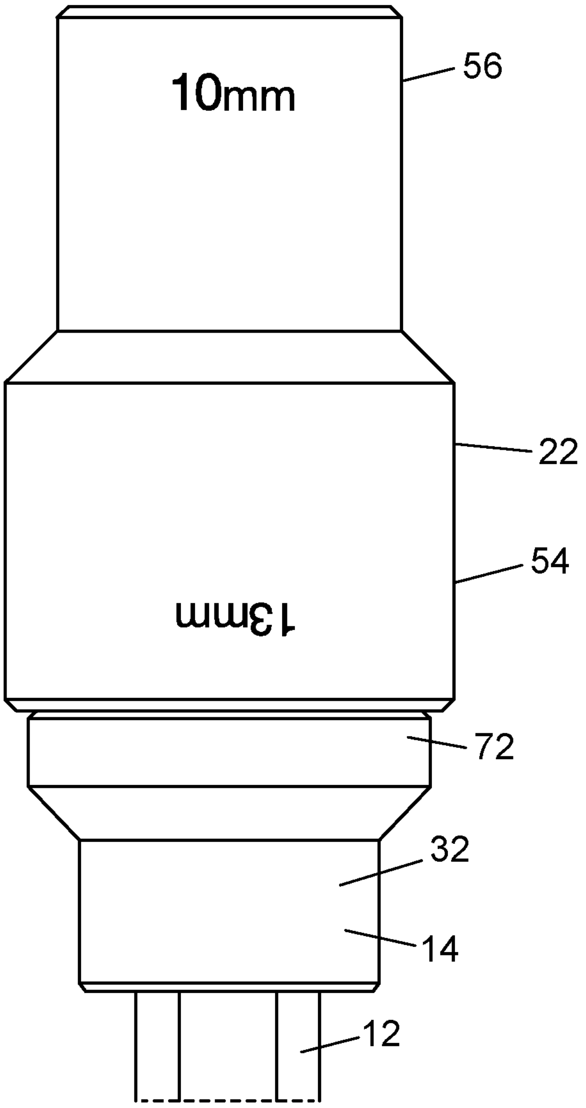
FIG. 11 shows another partial view (e.g., the front portion) of the socket driver tool, where a second end of the working socket is being supported by the socket support member of the socket positioning assembly according to an embodiment of the present patent application.

Referring to FIGS. 11-12, the socket support member 32 is configured to support the first socket 22 in its second use configuration in which the second fastener driving opening 60 is positioned to receive the second fastener. That is, when the socket 22 is in its second use configuration, the first support portion/outer flange 72 is configured to support the first end 54 of the socket 22. The surface 80 of the outer flange 72 of the socket support member 32 is configured to support the first socket 22 in its second use configuration. The transversely extending surface 84 at the first end 54 of the socket 22 is supported by or is abutting the surface 80 of the outer flange 72 when the first socket 22 in its second use configuration.

When the socket 22 is in its second use configuration (as shown in FIGS. 11-12) with the first support portion/outer flange 72 supporting the first end 54 of the socket 22, the fastener retainer 38 of the shaft 12 is configured and positioned in the second fastener driving opening 60 so as to better accommodate the smaller second fastener in the second fastener driving opening 60. Also, when the socket 22 is in its second use configuration with the first support portion/outer flange 72 supporting the first end 54 of the socket 22, the fastener retainer 38 of the shaft 12 is also configured to apply (e.g., magnetic) force to retain the second fastener received in the second fastener driving opening 60.

The inner flange 76 and the outer flange are configured to maintain the position of the socket 22 with respect to socket support member 32 when the socket 22 is either in its first use configuration or in its second use configuration. One of the reasons for the inner flange 72 and outer flange 76 is to allow larger diameter sockets 58 to sit further rearward on the shaft 12 and abut the outer flange 76 while smaller diameter sockets 60 sit further forward on the shaft 12 and abut the inner flange 72 (as can be seen comparing d1 in FIG. 10 with d2 in FIG. 12). The tool 10 of the present patent application allows for expansion of sizes by incorporating a stepped flange (e.g., inner flange 72 and other flange 76 of the socket support member 32) onto the working end of the socket adapter to properly support the larger sockets. One of the benefits from adding step to the flange is to properly calibrate the distance from the magnet 38 to the fastener head that typically varies by size.

The socket retainer 34 is configured to retain at least the second socket 24 in its storage configuration on the shaft 12. The socket retainer 34 is positioned between the first socket 22 and the second socket 24. In one embodiment, the socket retainer 34 is integrally formed with the shaft 12. In another embodiment, the socket retainer is movable relative to the shaft 12.

Figure 8:
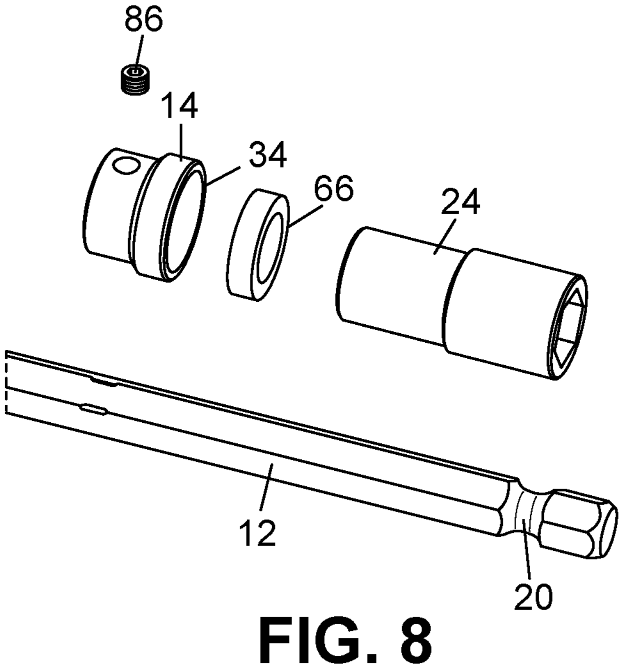
FIG. 8 shows a partial exploded view (e.g., a middle and/or a rear portion) of the socket driver tool along with the socket retainer of the socket positioning assembly and a parking socket according to an embodiment of the present patent application.

The socket retainer 34 may be fixedly disposed on the shaft 12. The socket retainer 34 may be removably disposed on the shaft 12 so it can be moved to different locations/positions on the shaft 12 (e.g., to position the socket retainer 34 on the shaft 12 at a new location/position) as desired. In one embodiment, the socket retainer 34 is disposed on the shaft 12 using a fastener 86 (e.g., a headless screw 86 is shown in FIG. 8). This embodiment allows the socket retainer 34 to be slideable on the shaft 12 and be fixed at a desired location. For example, the socket retainer 34 may be moved closer to the socket support member 32 (at or near the front end portion 16 of the shaft 12) so as to provide more space for parking/storing additional sockets between the socket retainer 34 and the circumferential groove 20 at the rear end portion 18 of the shaft 12. In another embodiment, the socket retainer 34 may be glued/adhesively connected to the shaft 12. In yet another embodiment, the socket retainer 34 may include a stamped feature receiving portion on an inner surface thereof. The stamped feature receiving portion is configured to receive or engage a stamped feature on the shaft 12 to position the socket retainer 34 on the shaft 12.

Referring to FIG. 2, the socket retainer 34 may generally include a first diameter portion 88 with a first end and a second end, a second diameter portion 90 with a first end and a second end and an intermediate/transition portion 92 positioned between the second diameter portion and the first diameter portion. The intermediate/transition portion 92 connects a second end of the first diameter portion 88 to a first end of the second diameter portion 90. The second diameter portion 90 is larger in size than the first diameter portion 88. The second diameter portion 90 is positioned closer to the circumferential groove 20 of the shaft 20 than the first diameter portion 88.

The second diameter portion 90 includes a retainer receiving portion therein that is configured to receive the retainer 66. In one embodiment, the retainer 66 may be a magnet member 66 that is configured to apply magnetic force to retain the second socket 24, in its storage configuration, on the shaft 12 and in between the socket retainer 34 and the circumferential groove 20 of the shaft 12. The magnet member 66 is a ring or an annular magnet. The magnet member/retainer 66 of the socket retainer 34 includes a shaft opening therethrough. The shaft opening is configured to receive a portion of the shaft 12 therein.

The socket retainer 34 includes a shaft opening therethrough and extending through the intermediate/transition portion, the second diameter portion and the first diameter portion of the socket retainer 34. The shaft opening is configured to receive a portion of the shaft 12 therein. The stamped feature of the shaft 12 may be positioned in this portion of the shaft 12. The stamped feature of the shaft 12 may be configured to engage with or be received in the corresponding stamped feature receiving portion on the inner surface of the socket retainer 34 so as to position the socket retainer 34 to the shaft 12.

Figure 13:
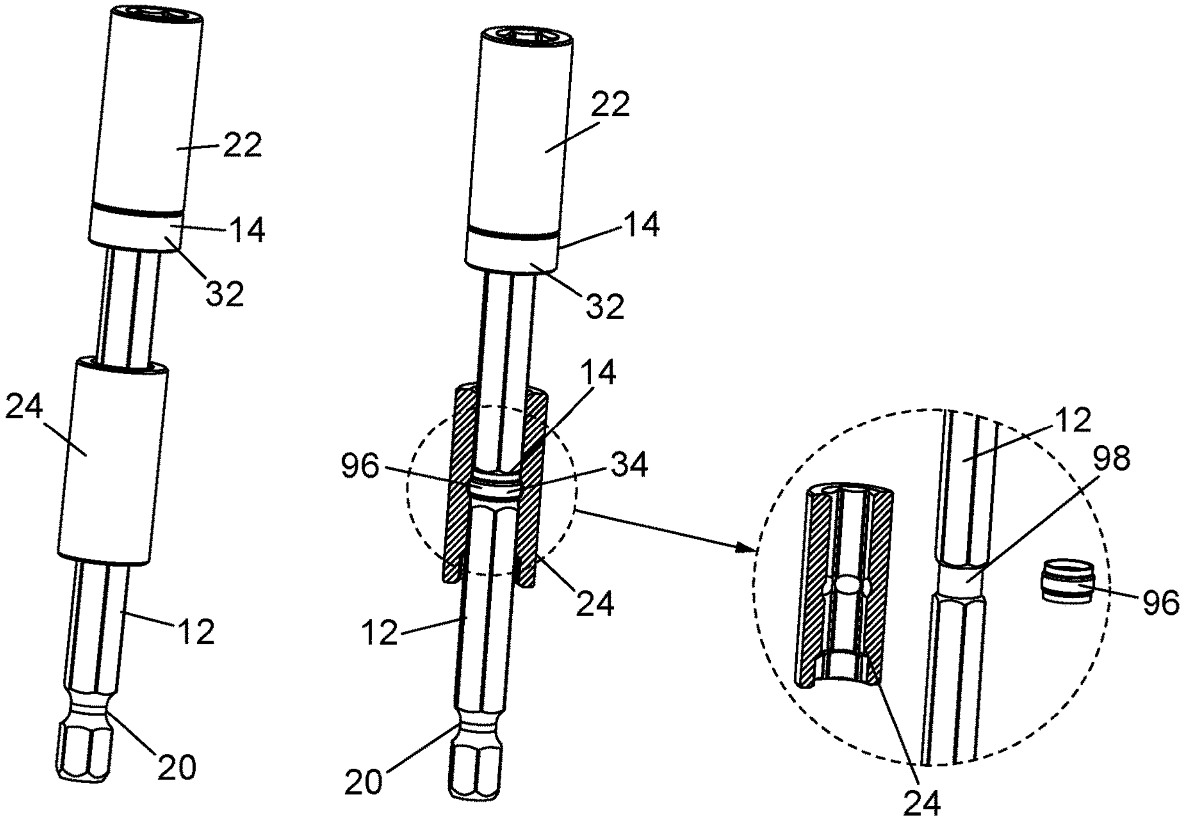
FIG. 13 shows the socket driver tool with the socket positioning assembly and the at least two sockets disposed thereon according to another embodiment of the present patent application.
Figure 14:
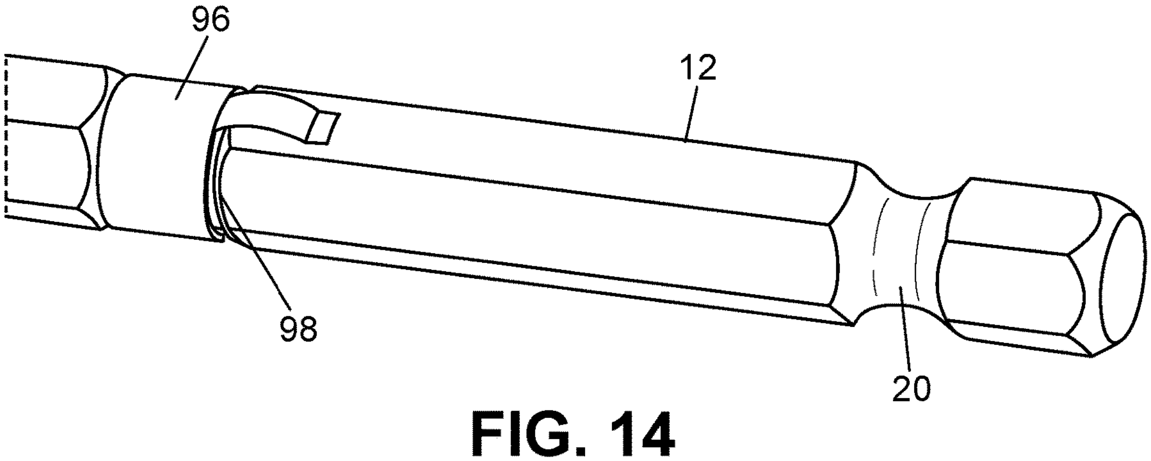
FIG. 14 shows a partial view (e.g., the middle and/or the rear portion) of the socket driver tool according to another embodiment of the present patent application, where a spring band/clip assembly is used to retain the parking socket on the socket driver tool in FIGS. 13-14.

In another embodiment, as shown in FIGS. 13-14, the socket retainer 34 may include a spring biased lock 96 instead of a magnetic retainer 66. The spring biased lock 96 may be a spring band 96 that is received in a groove 98 of the shaft 12 near an intermediate portion of the shaft 12. The spring band 96 is configured to resiliently biased into engagement with the inner surface of the second socket 24 to retain the second socket 24 on the shaft 12. The spring biased lock 96 may serve as the socket retainer 34.

Figure 17:
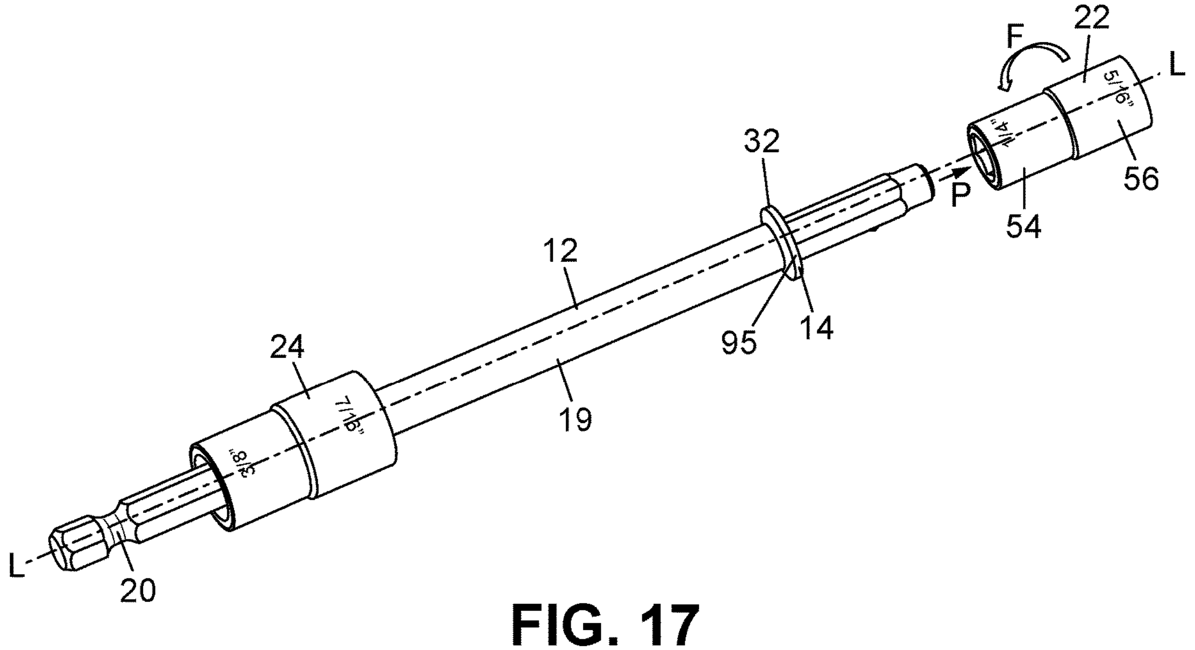
FIG. 17 shows the socket driver tool with the socket positioning assembly and the at least two sockets disposed thereon according to an embodiment of the present patent application, where the parking socket is in its storage configuration and the working socket is removed from the socket driver tool and is being moved from its first use configuration to its second use configuration.
Figure 18:
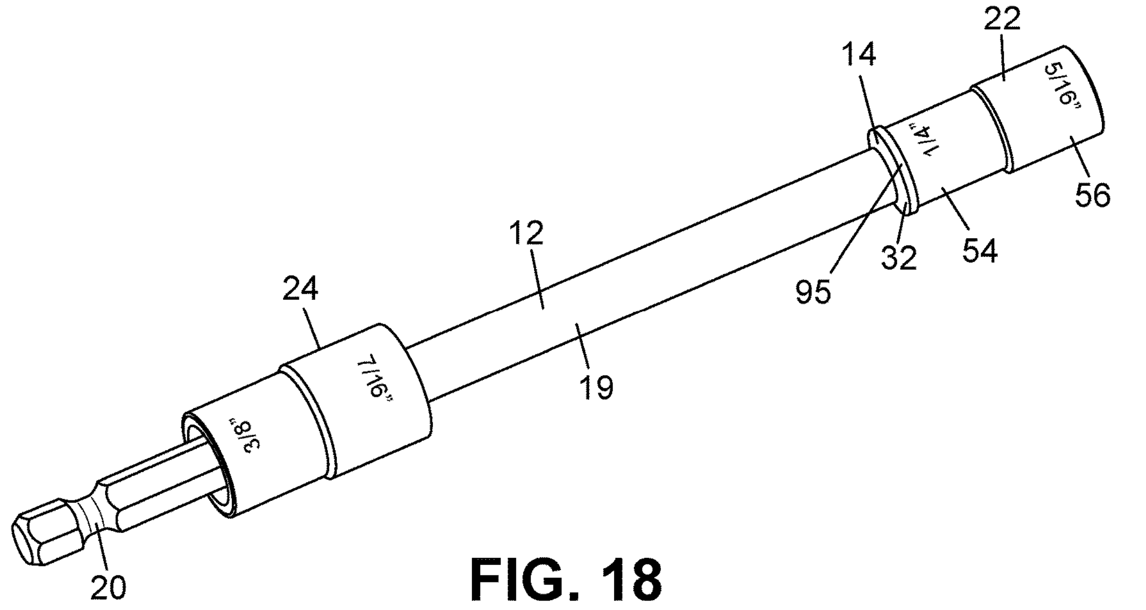
FIG. 18 shows the socket driver tool with the socket positioning assembly and the at least two sockets disposed thereon according to an embodiment of the present patent application, where the parking socket is in its storage configuration and the working socket is in its second use configuration.
Figure 19:
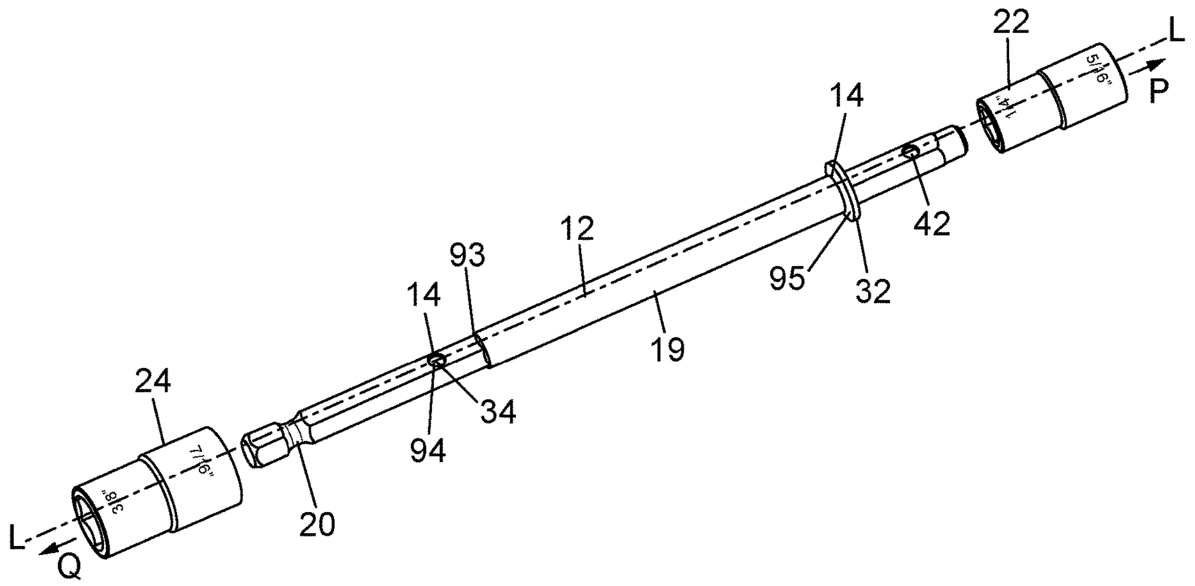
FIG. 19 shows the socket driver tool with the socket positioning assembly and the at least two sockets disposed thereon according to an embodiment of the present patent application, where the working socket and the parking socket are being removed from the socket driver tool.
Figure 22:
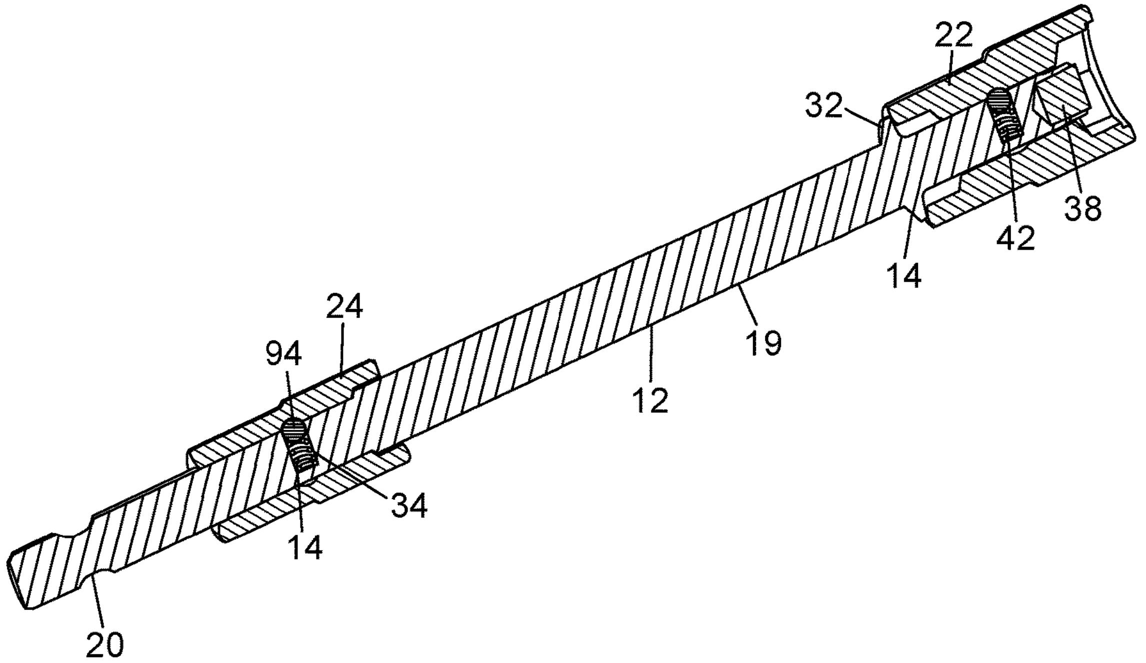
FIG. 22 shows a cross-sectional view of the socket driver tool of FIG. 21, where the working socket is in its use configuration and the parking socket is in its storage configuration.

In yet another embodiment, as shown in FIGS. 15-23, the socket retainer 34 may include another spring biased lock 94 instead of a magnetic retainer 66. The construction and operation of this lock 94 is similar to the lock 42. For example, as shown in FIG. 22, the spring biased lock 94 may include one or more detent balls or pins 94 that are positioned within a hollow, cylinder-shaped body and are resiliently biased (by a spring) into engagement with the inner surface of the second socket 24 to retain the second socket 24 on the shaft 12. In this embodiment, as shown in FIG. 19, the spring biased lock 94 may be used in combination with a chamfered rim 93 to retain the second socket 24 on the shaft 12. The spring biased lock 94 may serve as the socket retainer 34. The spring biased lock 94 and the chamfered rim 93 together may serve as the socket retainer 34.

In one embodiment, portions of the inner surface of the socket that engage with the spring biased lock 94 or 96 (to retain the socket is in its storage configuration) are the same as the portions of the inner surface of the socket that engage with the lock 42 at the front end portion 16 of the shaft 12 (to retain the socket is in its user position). That is, the same portions of the inner surface of the socket are used with the rear lock 94 or 96 to retain the socket is in its storage configuration on the shaft 12 and used with the front lock 42 to retain the socket is in its use configuration on the shaft 12.

In one embodiment, the tool 10 may have two socket retainers 34, for example, a first/front socket retainer adjacent to the socket support member 32 at the front end portion 16 of the shaft 12 and a second/rear socket retainer adjacent to the circumferential groove 20. The parking sockets being placed between and retained by the front socket retainer and the rear socket retainer. The magnets of the front socket retainer and the rear socket retainer may be facing each other and may be facing the parking sockets so as to retain the parking sockets therebetween.

The different diameter portions of the socket retainer 34 and the socket support member 32 are configured to remove the excess material (where the material is not needed) so as to reduce the overall weight of the socket positioning assembly 14 including the socket retainer 34 and the socket support member 32.

Figure 15:
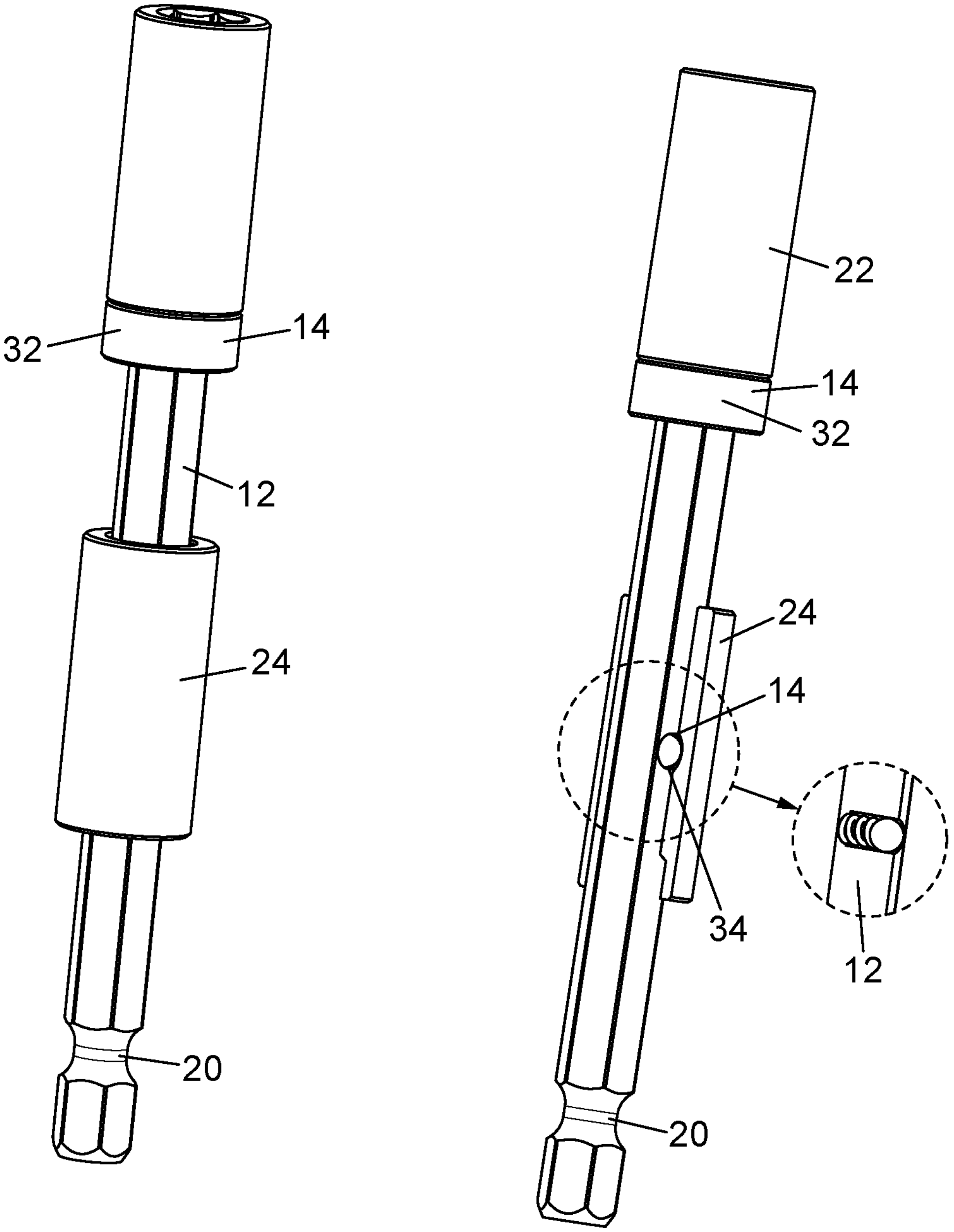
FIG. 15 shows the socket driver tool with the socket positioning assembly and the at least two sockets disposed thereon according to yet another embodiment of the present patent application, where a spring detent assembly is used to retain the parking socket on the socket driver tool.

The socket 22 or 24 is a stored socket that is stored on the shaft 12 and between the socket retainer 34 and the rear end portion 18 of the shaft 12. In one embodiment, as shown in FIGS. 15, 19 and 22, the socket retainer 34 has a ball 94 biased radially outward to engage with the stored socket 22 or 24. In another embodiment, as shown in FIG. 13, the socket retainer 34 has a groove 98 and an O-ring 98 that frictionally engages with the stored socket 22 or 24.

In one embodiment, as shown in FIGS. 16-23, the present patent application provides another 4-in-1 hex socket holder extension 10 that comprises the elongated shaft 12 with the front end portion 16 and the rear end portion 18. In this embodiment, the elongated shaft 12 includes a cylindrical intermediate portion 19 disposed between the front end portion 16 and the rear end portion 18. In one embodiment, the rear end portion 18 includes the hex shank 12 with the annular or circumferential groove 20 that always has at least 26 mm of length exposed to couple to a drill or impact driver 1000. The rear hex shank 18 extends further toward the front where it abuts the cylindrical intermediate section 19 at a chamfered rim 93 (as shown in FIG. 19). The front end portion 16 has a hex shaped cross section and abuts the cylindrical intermediate section 19 at a flange 95 (as shown in FIG. 19). In one embodiment, the flange 95 may be interchangeably referred to as the socket support member 32 of the socket positioning assembly 14. The hex shaped portion of the front end portion 16 has the radial spring-loaded ball 48. The hex shaped portion of the rear end portion 18 has a radial spring-loaded ball 94 (as shown in FIG. 19). In one embodiment, the chamfered rim 93 and the radial spring-loaded ball 94 may together be interchangeably referred to as the socket retainer 34 of the socket positioning assembly 14.

The operation or use of the 4-in-1 hex socket holder extension 10 is shown and explained with respect to FIGS. 16-23. The same operation is equally applicable for other embodiments of the 4-in-1 hex socket holder extension 10 shown in other figures of the present patent application.

Figure 16:
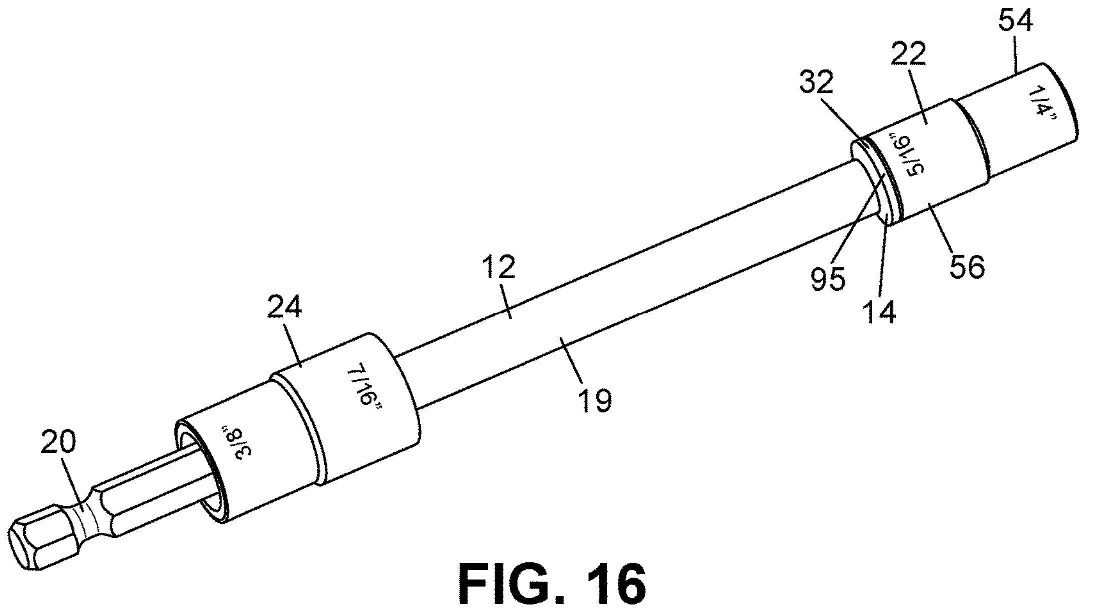
FIG. 16 shows the socket driver tool with the socket positioning assembly and the at least two sockets disposed thereon according to yet another embodiment of the present patent application, where the working socket is in its first use configuration and the parking socket is in its storage configuration.

For example, FIG. 16 shows the socket driver tool 10 with the socket positioning assembly 14 and the at least two sockets 22, 24 disposed thereon, where the working socket 22 is in its first use configuration and the parking socket 24 is in its storage configuration.

As shown in FIG. 16, the front end portion 16 of the shaft 12 carries a first double ended socket 22 (i.e., a socket with two different sized ends). In one embodiment, the first socket 22 is supported on the shaft 12 by the socket support member 32 of the socket positioning assembly 14. In another embodiment, the first socket 22 may abut the flange 95 that serves as the socket support member 32 of the socket positioning assembly 14. The first socket 22 is retained on the front end portion 16 by the lock 42 (or by the spring-loaded ball 48 of FIG. 19). When installed on the front end portion 16 of the shaft 12, the first socket 22 is configured to use its first end 54 to receive a first fastener.

FIG. 17 shows the parking socket 24 is in its storage configuration and the working socket 22 is removed from the socket driver tool 10 and is being moved from its first use configuration to its second use configuration. The first socket 22 can be removed from the shaft 12. For example, the first socket 22 can simply be pulled away (along the longitudinal axis L-L of the shaft and in the direction of the arrow P) from the shaft 12. This pulling movement overcomes the spring bias of the lock 42 and facilitates the removal of the first socket 22 from the shaft 12. The first socket 22 can then be flipped in an opposite direction (i.e., in the direction of the arrow F). The first socket 22 is flipped such that the first end 54 of the first socket 22 is now facing towards from the shaft 12 and the second end 56 of the first socket 22 is now away from the shaft 12.

The first socket 22 can be reinstalled on the front end portion 16 to use the other end 56 of the socket 22 to receive a second fastener. The first socket 22 can be reinstalled on the shaft 12 by simply pushing the first socket 22 (along the longitudinal axis L-L of the shaft and in the direction opposite to the arrow P) toward the shaft 12. This pushing movement automatically locks the first socket 22 on the shaft 12 using the spring biased lock 42. FIG. 18 shows the parking socket 24 is in its storage configuration and the working socket 22 is in its second use configuration.

Thus, the first socket 22 can be very easily moved between the first use configuration as shown in FIG. 16 in which the first fastener driving opening at the first end 54 is configured and receive the first fastener to the second use configuration as shown in FIG. 18 in which the second fastener driving opening at the second end 56 is configured to receive a second fastener.

Figure 20:
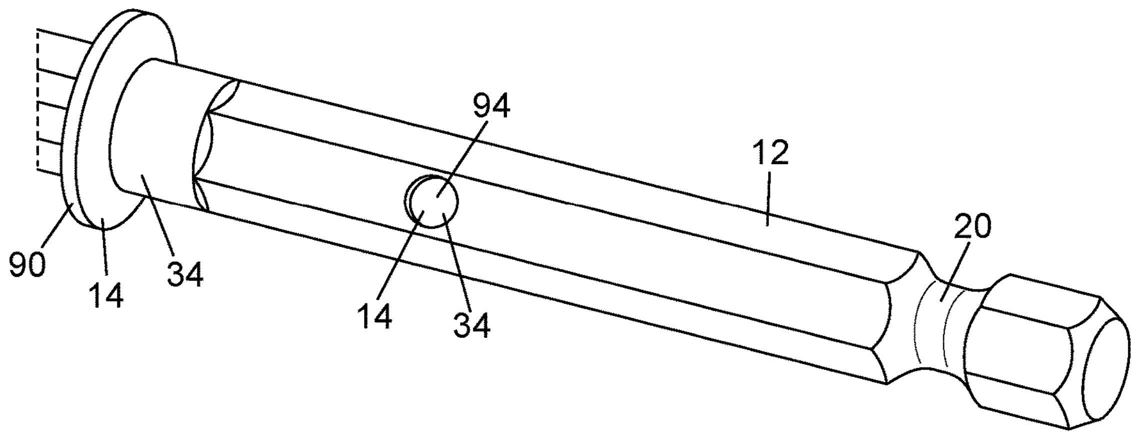
FIG. 20 shows a partial view (e.g., the middle and/or the rear portion) of the socket driver tool according to an embodiment of the present patent application, where the spring detent assembly that is used to retain the parking socket on the socket driver tool is shown.

The rear end portion 18 of the shaft 12 carries a second double ended socket 24. FIG. 20 shows the spring detent assembly that is used to retain the parking socket 24 on the socket driver tool 10. In one embodiment, the second double ended socket 24 is retained by the socket retainer 34 (with the retainer/magnet 66) of the socket positioning assembly. In another embodiment, the second double ended socket 24 abuts the chamfered rim 93 and is retained by the spring biased ball 94 on the rear end portion 18. The second socket 24 is retained far enough toward the front end so that the shank 12 can still be coupled to the tool/bit holder 26 of the drill or impact driver 1000 while the second socket 24 is installed.

In addition, the first and second sockets 22, 24 can be interchanged (with the first socket 22 on the rear end portion 18 and the second socket 24 on the front end portion 16). FIG. 19 shows the working socket 22 and the parking socket 24 are being removed from the socket driver tool 10. As shown in FIG. 19, the first and second sockets 22, 24 can simply be pulled away (along the longitudinal axis L-L of the shaft and in the direction of the arrows P and Q, respectively) from the shaft 12. The pulling movement of the first socket 22 overcomes the spring bias of the lock 42 at the front end portion 16 and facilitates the removal of the first socket 22 from the shaft 12. The pulling movement of the second socket 24 overcomes the spring bias of the spring-loaded ball 94 at the rear end portion 18 or overcomes the magnetic force of the socket retainer 34 and facilitates the removal of the second socket 24 from the shaft 12. The second socket 24 is configured to be switched from its storage configuration on the shaft 12 to its use configuration in which the socket support member 32 supports the second socket 24 at the front end portion 16 of the shaft 12. At the same time, the first socket 22 is configured to be switched from its use configuration to its storage configuration on the shaft 12 in which the socket retainer 34 retains the first socket 22 between the socket retainer 34 and the circumferential groove 20 of the shaft 12.

Comparing the FIGS. 18-19 with FIG. 21 shows that the parking socket 24 in FIGS. 18 and 19 is being used as the working socket 22 in FIG. 21 and the working socket 22 in FIGS. 18 and 19 is being stored as the parking socket 24 on the socket driver tool of FIG. 21. FIG. 22 shows a cross-sectional view of the socket driver tool, where the working socket 22 is retained/locked in its use configuration by the lock 42 and the parking socket 24 is retained/locked in its storage configuration by the lock 94. In this embodiment, both the working socket 22 is retained/locked in its use configuration and the parking socket 24 is retained/locked in its storage configuration by the spring biased locks.

Also, when coupled to the front end portion 16, the second socket 22 can also be flipped to use both ends of the socket 22. Thus, the socket holder extension enables the storage and use of 4 different sizes of sockets. The socket holder extension of the present patent application is also very easy to use as the sockets are removed by simply pulling them away from the shaft 12. The sockets are then either flipped or interchanged with other sockets to reinstall and use the desired socket size.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A socket driving tool comprising:

an elongated shaft having a front end portion and an opposing rear end portion configured to be mounted for rotation by a hand tool or a power tool, wherein the shaft is configured to support at least two sockets, including a first socket and a second socket, each of the at least two sockets being selectively positionable on the shaft in either a use configuration or in a storage configuration, and a socket positioning assembly disposed on the shaft, the socket positioning assembly including:

a socket support member coupled to the shaft and configured to support the first socket in the use configuration proximate the front end portion of the shaft, and a socket retainer coupled to the shaft and configured to retain the second socket in the storage configuration on the shaft between the socket retainer and the rear end portion of the shaft, the socket retainer being positioned between the first socket and the second socket, wherein the shaft, rearward of the socket retainer, comprises a continuous surface without abutment to enable removal of the second socket from the socket retainer in a rearward direction, and wherein the socket support member includes an inner flange and an outer flange, the inner flange and the outer flange have different dimensions for abutting different sized end portions of one of the first socket or the second socket.

2. The socket driving tool of claim 1, wherein the socket retainer and the socket support member are configured to enable the second socket to be switched from the storage configuration to the use configuration in which the socket support member supports the second socket proximate the front end portion of the shaft, and to enable the first socket to be switched from the use configuration to the storage configuration in which the socket retainer retains at least the first socket between the socket retainer and the rear end portion of the shaft.

3. The socket driving tool of claim 2, wherein the socket retainer includes a magnet configured to apply magnetic force to retain the first socket or the second socket in the storage configuration on the shaft, the magnet positioned between the socket retainer and the rear end portion of the shaft.

4. The socket driving tool of claim 3, wherein the magnet comprises a ring-shaped magnet.

5. The socket driving tool of claim 1, wherein each socket has two different sized fastener driving openings including a first fastener driving opening disposed at a first end portion of the socket and a second fastener driving opening disposed at a second end portion of the socket, and wherein each socket is configured to be reversibly retainable on the front end portion of the shaft with the socket support member supporting the socket such that, in a first use configuration of the socket, the first fastener driving opening extends axially forward of the front end portion of the shaft in order to receive and drive a first fastener when the shaft is rotated, and in a second use configuration of the socket, the second fastener driving opening extends axially forward of the front end portion of the shaft in order to receive and drive a second fastener when the shaft is rotated.

6. The socket driving tool of claim 1, wherein the socket support member comprises a ball coupled to the front end portion of the shaft and configured to be biased radially outward to engage a groove inside at least one of the first socket or the second socket.

7. The socket driving tool of claim 1, further comprising a magnet coupled to the front end portion of the shaft for magnetizing a fastener to be driven by one of the first socket or the second socket.

8. The socket driving tool of claim 1, wherein the socket retainer comprises a ball biased radially outward to engage a groove inside at least one of the first socket or the second socket.

9. The socket driving tool of claim 8, wherein the ball is received in a recess in the shaft and the first socket or the second socket is configured to span the recess to maintain torque along the shaft.

10. The socket driving tool of claim 1, wherein the socket retainer comprises an O-ring that frictionally engages at least one of the first socket or the second socket.

11. The socket driving tool of claim 1, wherein the rear end portion of the shaft includes a circumferential groove for mounting the shaft for rotation by the hand tool or the power tool, wherein, when the second socket is retained in the storage configuration, a forward end portion of the second socket engages with a rear end portion of the socket retainer, and wherein the continuous surface without abutment of the shaft is disposed between the circumferential groove of the shaft and a rear end portion of the second socket when the second socket is retained in the storage configuration.

12. A socket driving tool system comprising:

an elongated shaft having a front end portion and an opposing rear end portion, the rear end portion configured to be mounted for rotation by a hand tool or a power tool, a socket positioning assembly disposed on the shaft, the socket positioning assembly including a socket support member proximate the front end portion of the shaft, and a socket retainer between the socket support member and the rear end portion of the shaft, a first socket having a first end portion including a first fastener driving opening, a second end portion, and a first engagement portion disposed on an inner surface of the first socket between the first and second end portions of the first socket, a second socket having a third end portion including a third fastener driving opening, a fourth end portion, and a second engagement portion disposed on an inner surface of the second socket between the third and fourth end portions of the second socket, wherein the first socket and the second socket are interchangeably coupleable to the shaft in a use configuration or a storage configuration, wherein, in the use configuration, one of the first socket or the second socket is releasably retained on the front end portion of the shaft with the socket support member engaging the first engagement portion or the second engagement portion and the first fastener driving opening or the second fastener driving opening extending axially forward of the front end portion of the shaft in order to receive and drive a fastener when the shaft is rotated, wherein, in the storage configuration, the other of the first socket and the second socket is releasably retained on shaft between the socket retainer and the rear end portion of the shaft by engagement between the socket retainer and the other of the first socket and the second socket, wherein the shaft, rearward of the socket retainer, comprises a continuous surface without abutment to enable removal of the other of the first socket and the second socket from the socket retainer in a rearward direction, and wherein the socket retainer includes a magnet configured to apply magnetic force to retain the first socket or the second socket in the storage configuration on the shaft, the magnet positioned between the socket retainer and the rear end portion of the shaft.

13. The socket driving tool system of claim 12, wherein the first socket includes a second fastener driving opening at the second end portion of the first socket, the first socket being reversibly retainable on the front end portion of the shaft with the socket support member engaging the first engagement portion, such that in a first use configuration the first fastener driving opening extends axially forward of the front end portion of the shaft in order to receive and drive a first fastener when the shaft is rotated and in a second use configuration, the second fastener driving opening extends axially forward of the front end portion of the shaft in order to receive and drive a second fastener when the shaft is rotated.

14. The socket driving tool system of claim 13, wherein the first fastener driving opening and the second fastener driving opening have different sizes.

15. The socket driving tool system of claim 14, wherein the second socket includes a fourth fastener driving opening at the fourth end portion of the second socket, the second socket being reversibly retainable on the front end portion of the shaft with the socket support member engaging the second engagement portion, such that in a third use configuration the third fastener driving opening extends axially forward of the front end portion of the shaft in order to receive and drive a third fastener when the shaft is rotated and in a fourth use configuration, the fourth fastener driving opening extends axially forward of the front end portion of the shaft in order to receive and drive a fourth fastener when the shaft is rotated.

16. The socket driving tool system of claim 15, further comprising a magnet coupled to the front end portion of the shaft that is configured to apply magnetic force to retain the second fastener received in the second fastener driving opening when the first socket is in its second use configuration, and to retain the first fastener received in the first fastener driving opening when the first socket is in the first use configuration.

17. The socket driving tool system of claim 12, wherein the socket support member includes an inner flange and an outer flange, the inner flange and the outer flange have different dimensions for abutting different sized end portions of one of the first socket or the second socket.

18. The socket driving tool system of claim 17, wherein the outer flange and the inner flange of the socket support member are disposed axially adjacent to each other along a longitudinal axis of the shaft.

19. The socket driving tool of claim 12, wherein the socket retainer comprise an O-ring or a ball biased radially outward to engage a groove inside at least one of the first socket or the second socket.

20. The socket driving tool of claim 12, wherein the rear end portion of the shaft includes a circumferential groove for mounting the shaft for rotation by the hand tool or the power tool, wherein, when the other of the first socket and the second socket is retained in the storage configuration, a forward end portion of the other of the first socket and the second socket engages with a rear end portion of the socket retainer, and wherein the continuous surface without abutment of the shaft is disposed between the circumferential groove of the shaft and a rear end portion of the other of the first socket and the second socket when the other of the first socket and the second socket is retained in the storage configuration.

* * * * *